US010346994B2

(12) United States Patent
Smith

(10) Patent No.: US 10,346,994 B2
(45) Date of Patent: Jul. 9, 2019

(54) SYSTEMS AND METHODS FOR INWARD-LOOKING DEPTH SCANNING OF A REAL-WORLD SCENE

(71) Applicant: Verizon Patent and Licensing Inc., Arlington, VA (US)

(72) Inventor: Steven L. Smith, Putnam Valley, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 61 days.

(21) Appl. No.: 15/663,718

(22) Filed: Jul. 29, 2017

(65) Prior Publication Data

US 2019/0035097 A1  Jan. 31, 2019

(51) Int. Cl.
| | | |
|---|---|---|
| G01S 17/42 | (2006.01) | |
| G06T 7/521 | (2017.01) | |
| G06T 19/00 | (2011.01) | |
| G01S 17/89 | (2006.01) | |
| G01S 7/481 | (2006.01) | |
| G01S 7/48 | (2006.01) | |

(52) U.S. Cl.
CPC ............ *G06T 7/521* (2017.01); *G01S 7/4808* (2013.01); *G01S 7/4817* (2013.01); *G01S 17/42* (2013.01); *G01S 17/89* (2013.01); *G06T 19/003* (2013.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 10,009,640 | B1* | 6/2018 | Lodato | H04N 21/2368 |
| 10,074,191 | B1* | 9/2018 | Reome | G01B 11/2518 |
| 2003/0137449 | A1* | 7/2003 | Vashisth | G01C 11/02 |
| | | | | 342/357.31 |
| 2012/0176380 | A1* | 7/2012 | Wang | G01B 11/2545 |
| | | | | 345/420 |
| 2014/0071234 | A1* | 3/2014 | Millett | G01S 17/89 |
| | | | | 348/43 |
| 2017/0094259 | A1* | 3/2017 | Kouperman | H04N 13/111 |
| 2017/0310948 | A1* | 10/2017 | Pei | G01S 17/10 |
| 2017/0316606 | A1* | 11/2017 | Khalid | G06T 17/00 |

FOREIGN PATENT DOCUMENTS

| | | | | | |
|---|---|---|---|---|---|
| JP | | 58018110 A | * | 2/1983 | G01B 11/24 |
| JP | | S58018110 A | * | 2/1983 | G01B 11/24 |

* cited by examiner

Primary Examiner — Kee M Tung
Assistant Examiner — Patrick F Valdez

(57) ABSTRACT

An exemplary depth scanning system includes first and second depth scanning devices. The first device detects depth data for surfaces included within a real-world scene from a first vantage point by rotating a first scan head in one rotational direction to progressively aim a first scan field to sweep across the surfaces during a scan time period. The second device detects depth data for the surfaces from a second vantage point by rotating a second scan head in phase with the rotation of the first scan head and in the opposite rotational direction so as to progressively aim a second scan field to sweep across the surfaces during the scan time period. The in-phase rotations of the first and second scan heads cause the first scan field to aim at the second vantage point at a same moment when the second scan field aims at the first vantage point.

20 Claims, 17 Drawing Sheets

SYSTEMS AND METHODS FOR INWARD-LOOKING DEPTH SCANNING OF A REAL-WORLD SCENE

BACKGROUND INFORMATION

Depth data (e.g., spatial location data, positional coordinate data, etc.) for surfaces of objects in the world may be useful for detecting and/or modeling the objects for use in various applications. For example, depth data may be used in entertainment applications, automation applications (e.g., automated driving), educational applications, communication applications, vicarious experience/travel applications, and/or in connection with various other applications.

Virtual reality is one example of an application where users may experience (e.g., view, interact with, etc.) objects modeled using depth data. For instance, virtual reality media content may be used to immerse users (i.e., viewers of the virtual reality media content) into virtual reality worlds that the users may experience by directing their attention to any of a variety of things being presented in the virtual reality world at the same time. For example, at any time during the presentation of the virtual reality media content, a user experiencing the virtual reality world may look around in any direction, giving the user a sense that he or she is actually present in and experiencing the virtual reality world from a particular viewpoint or vantage point within the virtual reality world.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
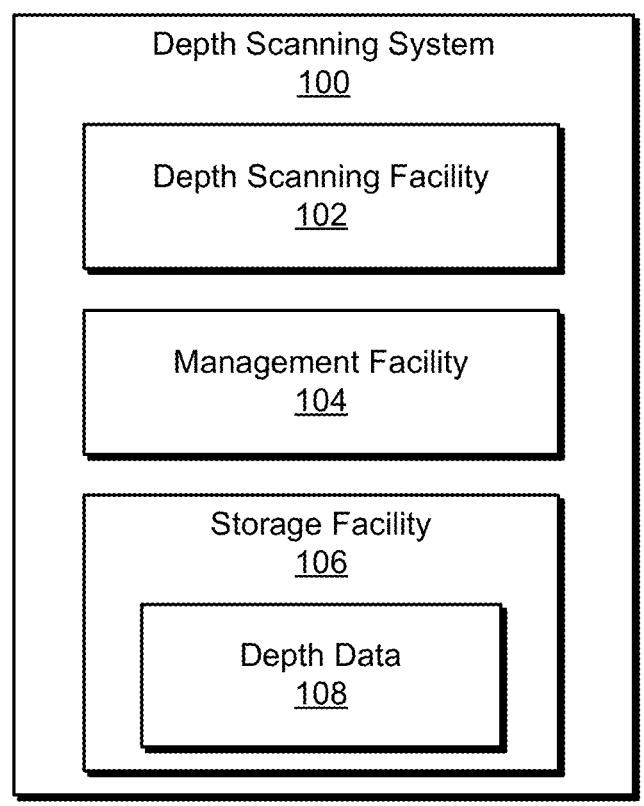
FIG. 1 illustrates an exemplary depth scanning system for inward-looking, phase-matched depth scanning of a real-world scene according to principles described herein.

Systems and methods for inward-looking depth scanning of a real-world scene are described herein. For example, as will be described in more detail below, in an embodiment, a depth scanning system may include a plurality of depth scanning devices configured to interoperate to perform the inward-looking, phase-matched depth scanning of the real-world scene. More particularly, in certain implementations, a depth scanning system may include a first depth scanning device and a second depth scanning device.

The first depth scanning device may be configured to be disposed at a first location with respect to a real-world scene, and may be configured to detect depth data for surfaces included within the real-world scene (e.g., physical surfaces of objects that are visible within the real-world scene) from a first vantage point of the first location. For example, the first depth scanning device may detect the depth data by rotating a first scan head of the first depth scanning device in a first direction (e.g., clockwise) so as to progressively aim a first scan field to sweep across the surfaces during a scan time period.

The second depth scanning device may be configured to be disposed at a second location with respect to the real-world scene, and may be configured to detect depth data for the surfaces from a second vantage point of the second location. For example, the second depth scanning device may detect the depth data by rotating a second scan head in phase with the rotation of the first scan head and in a second direction (e.g., counterclockwise) so as to progressively aim a second scan field to sweep across the surfaces during the scan time period. In certain examples, the in-phase rotations of the first and second scan heads may be configured (e.g., set, timed, synchronized, etc.) such that the first scan field aims at the second vantage point at a same moment during the scan time period when the second scan field aims at the first vantage point. For instance, the first and second scan heads may be synchronized to aim their respective scan fields at one another at the beginning of each scan time period (e.g., each scan cycle in a plurality of repeating scan cycles taking place during consecutive scan time periods), at the end of each scan time period, at a moment within each scan time period, at multiple moments within each scan time period, or the like. Examples of depth scanning devices that have rotating scan heads used to progressively aim respective scan fields across surfaces of objects during scan time periods will be described and illustrated below.

Along with the first and second depth scanning devices described above, the depth scanning system may further include one or more additional depth scanning devices (e.g., depth scanning devices that are similarly synchronized and/or configured to operate in phase with one another and/or with the first and second depth scanning devices), as well as other hardware and/or software components as may serve a particular implementation. For example, in certain implementations, the depth scanning system may include a depth map computing device (e.g., one or more server computers, etc.) configured to receive (e.g., from the first and second depth scanning devices) the detected depth data for the surfaces from the first and second vantage points, correlate the detected depth data based on timecodes included as metadata with the detected depth data, and generate a depth map of the surfaces based on the correlated detected depth data for the surfaces. Additionally, as will be described in more detail below, the depth scanning system may be integrated with and/or otherwise configured to interoperate with other systems and/or devices configured to detect and process other types of data for the surfaces included in the real-world scene. For example, a color capture system including a plurality of color capture devices (e.g., video cameras, etc.) may be configured to capture texture data (e.g., two-dimensional color video data) associated with the surfaces of the objects in the real-world scene from the same or similar vantage points that the depth data is captured by the depth scanning system.

As will be further described and made apparent below, systems and methods for detecting depth data and generating depth maps using disclosed techniques for inward-looking, phase-matched depth scanning of a real-world scene may provide various benefits and advantages. As one example, systems and methods described herein may allow inward-looking depth scanning systems to detect depth data and generate depth maps (e.g., four-dimensional depth maps representing surfaces with respect to three spatial dimensions and a fourth temporal dimension) with data captured from multiple vantage points simultaneously or within a shorter period of time than may be possible without use of the disclosed systems and methods.

Additionally, as will be described below, systems and methods described herein may help maximize efficient usage of depth scanning resources to efficiently detect relevant, detailed depth data in a relatively short period of time. As such, disclosed systems and methods may facilitate the generation of high quality (e.g., highly accurate, high resolution, etc.) depth data that may benefit various applications in which the depth data is employed. For instance, high quality depth data detected using systems and methods for inward-looking, phase-matched depth scanning of a real-world scene described herein may allow immersive virtual reality media content to be generated and distributed to users, benefitting both the users and the virtual reality providers providing the virtual reality media content. Using a system or method for inward-looking, phase-matched depth scanning allows for higher resolution depth capturing, more efficient use of resources and an improved time on target for the scanning system.

As one example, in an application involving virtual reality media content representative of a real-world scene, a user may become immersed in the real-world scene to an extent that may not be possible for people presented with the real-world scene by way of conventional media (e.g., television) or conventional virtual reality media. Specifically, four-dimensional modeling of the real-world scene using depth data detected in accordance with disclosed systems and methods may allow the user to dynamically and arbitrarily experience the real-world scene from any dynamically selectable virtual viewpoint that may be arbitrarily moved around within a virtual reality world representative of the real-world scene (i.e., as opposed to being statically tied to one or more virtual viewpoints within the virtual reality world that are preselected by a creator or provider of the virtual reality media content, as may be the case with conventional virtual reality media (e.g., 360 degree video)). Accordingly, the user may experience the real-world scene from perspectives that may not even be available to people physically present at the real-world scene. For example, a virtual reality user may be able to experience a live basketball game as if running up and down the court with the players, or may experience a live concert as if standing on stage next to the performers.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary depth scanning system 100 ("system 100") for inward-looking, phase-matched depth scanning of a real-world scene. As shown, system 100 may include, without limitation, a depth scanning facility 102, a management facility 104, and a storage facility 106 selectively and communicatively coupled to one another. It will be recognized that although facilities 102 through 106 are shown to be separate facilities in FIG. 1, facilities 102 through 106 may be combined into fewer facilities, such as into a single facility, or divided into more facilities as may serve a particular implementation. Each of facilities 102 through 106 may be distributed between multiple devices and/or multiple locations as may serve a particular implementation. Additionally, one or more of facilities 102 through 106 may be omitted from system 100 in certain implementations, while additional facilities may be included within system 100 in the same or other implementations. Each of facilities 102 through 106 will now be described in more detail.

Depth scanning facility 102 may include any suitable hardware or combination of hardware and software (e.g., depth scanning devices, computing devices, software running on the computing devices, etc.) that may be configured to be disposed at different locations with respect to a real-world scene and that may be configured to detect depth data for surfaces included within the real-world scene from a different vantage points. For example, depth scanning facility 102 may include a first depth scanning device and a second depth scanning device (e.g., implemented by Light Detection and Ranging ("LIDAR") devices configured to detect depth data based on a time of flight depth detection technique or by other suitable depth scanning devices such as pulsed Radio Detection and Ranging ("RADAR") devices or the like) configured to be disposed, respectively, at a first location and at a second location with respect to the real-world scene. The first depth scanning device may be configured to detect depth data for surfaces (e.g., visible surfaces of objects) included within the real-world scene from a first vantage point of the first location by rotating a first scan head in a first direction, such as a clockwise motion, so as to progressively aim a first scan field to sweep across the surfaces during a scan time period. Similarly, the second depth scanning device may be configured to detect depth data for the surfaces from a second vantage point of the second location by rotating a second scan head in phase with the rotation of the first scan head and in an opposite direction, such as a counterclockwise motion, so as to progressively aim a second scan field to sweep across the surfaces during the scan time period.

As used herein, "depth data" may include any spatial location data, positional coordinate data, or other data representative of a position of one or more surfaces of one or more objects in three-dimensional ("3D") space. For example, as will be described and illustrated below, depth data for surfaces of objects included in a real-world scene may describe spatial locations of the surfaces with respect to a 3D coordinate system (e.g., a 3D local coordinate system associated with a particular depth scanning device, a 3D global coordinate system referenced by multiple depth scanning devices, etc.). In certain examples, depth data may also be detected and tracked with respect to a fourth, temporal dimension such that a four-dimensional ("4D") depth map may be generated representative of the spatial positions of surfaces and how the surfaces move and change over time in both absolute space and in relation to each other. Depth data may be captured or otherwise detected in various ways and/or by various techniques including by systems and methods described herein. As will be described below, in certain examples, depth data may be combined and/or synchronized with video data (e.g., two-dimensional ("2D") video data) to generate virtual reality media content such as, for example, virtual reality content associated with a virtual reality world representative of a real-world scene that includes the objects. Examples of depth data, techniques for capturing depth data, and uses for depth data are described herein.

As used herein, a "real-world scene" with respect to which depth scanning devices included within a depth scanning system are disposed may be associated with any real-world scenery, real-world location, real-world event (e.g., live event, etc.), or other subject existing in the real world (e.g., as opposed to existing only in a virtual world) as may serve a particular implementation. For example, a real-world scene may include any indoor or outdoor real-world location such as the streets of a city, a museum, a scenic landscape, a satellite orbiting and looking down upon the Earth, the surface of another planet, or the like. In certain examples, a real-world scene may be associated with a real-world event such as a sporting event (e.g., a basketball game, etc.), a concert, a theatrical presentation, a large-scale celebration, a race, a political event, or any other real-world event. In the same or other examples, the real-world scene may be associated with a setting for a fictionalized scene (e.g., a set of a live-action virtual reality television show or movie) and/or any other scene at any other indoor or outdoor real-world location as may serve a particular implementation.

Accordingly, as used herein, "surfaces included within a real-world scene" may refer to any detectable (e.g., visible) surface of an object that is fully or partially located within a real-world scene and/or that is detectable from a location within the real-world scene. Such an "object" may refer to anything, whether living or inanimate, that exists in the real world and is associated with the real-world scene (e.g., is located within or around the real-world scene, is detectable from a location within the real-world scene, etc.). For example, "objects," as used herein, may refer to discrete objects that are traditionally considered objects as well as, more broadly, other animate or inanimate things and surfaces, such as people and other living things, the sun, liquids, gases, walls, ceilings, floors, and the like. To illustrate, if a real-world scene includes a real-world event such as an indoor basketball game, objects for which depth data may be detected may include the basketball being used for the game, the basketball court, the scoreboards, the basketball standards (i.e., the backboards, rims, nets, etc.), the players and referees participating in the game, the fans, the arena, and/or other objects present at and/or associated with the basketball game.

Management facility 104 may include one or more physical computing devices (e.g., the same hardware and/or software components included within depth scanning facility 102 and/or components separate from those of content presentation facility 102) that perform various operations associated with managing (e.g., synchronizing, directing, processing, etc.) depth scanning devices and/or other components of depth scanning facility 102, as well as with managing data detected by depth scanning facility 102. For example, management facility 104 may direct the first and second depth scanning devices, as well as other depth scanning devices included within depth scanning facility 102, to perform depth scanning in phase with one another (e.g., in synchronization). Specifically, for instance, management facility 104 may cause the timing of each scan cycle of the depth scanning devices to coincide such that the in-phase rotations of the first and second scan heads are configured with the first scan field aiming at the second vantage point at a same moment during the scan time period when the second scan field aims at the first vantage point.

As used herein, events may be considered to be "synchronous" or to occur "at a same moment" when the events happen in precise synchronization or at precisely the same moment, as well as when the synchronization is only approximate and/or when the events happen at approximately the same moment. For example, management facility 104 may be configured to cause depth scanning devices to operate synchronously (i.e., in phase with one another) but may be unable to keep the depth scanning device in perfect synchronization all the time (e.g., one depth scanning device may be a few milliseconds (e.g., about zero to twenty milliseconds) or degrees (e.g., about zero to ten degrees) out of phase from another at least during some portion of the scan time period). Similarly, management facility 104 may be configured to cause the first scan field to aim at the second vantage point and the second scan field to aim at the first vantage point at a same moment, but, due to imperfections of the synchronicity between the depth scanning devices, may actually cause the respective scan fields to aim at the respective vantage points at distinct times that are only approximately the same (e.g., a few milliseconds away from one another in certain embodiments). In a similar way, it will be understood that the aiming of a scan field at a particular vantage point (e.g., the first scan field aiming at the second vantage point or the second scan field aiming at the first vantage point), as used herein, may refer to an approximate aiming of the scan field at the particular vantage point. For instance, the scan field may be directed at a point a few degrees off from the vantage point and still be considered to be "aiming at" the vantage point in certain implementations.

Additionally, management facility 104 may perform various other operations to receive, process, and provide the depth data detected by depth scanning facility 102 to facilitate use of the depth data by other systems or other facilities of system 100 not explicitly shown. For example, management facility 104 (e.g., a depth map computing device included within management facility 104) may receive the detected depth data for the surfaces from the first and second depth scanning devices, correlate the detected depth data based on timecodes included as metadata with the detected depth data (e.g., by associating depth data detected by one depth scanning device at a particular time with depth data detected by other depth scanning devices at the same particular time, based on the timecodes), generate a depth map of the surfaces based on the received detected depth data for the surfaces, and provide the depth map for use by another system or facility. Management facility 104 may further perform any other operations described herein or as may serve a particular implementation.

Storage facility 106 may maintain depth data 108 and/or any other data received, generated, managed, maintained, used, and/or transmitted by facilities 102 and 104. Depth data 108 may include depth data for surfaces of objects included in a real-world scene (e.g., detected by depth scanning facility 102) or depth maps based on the depth data (e.g., generated by management facility 104). Examples of depth data will be provided and illustrated below. Storage facility 106 may further include any other data as may be used by facilities 102 and 104 to perform inward-looking, phase-matched depth scanning of a real-world scene as may serve a particular implementation (e.g., software instructions, etc.).

Figure 2:
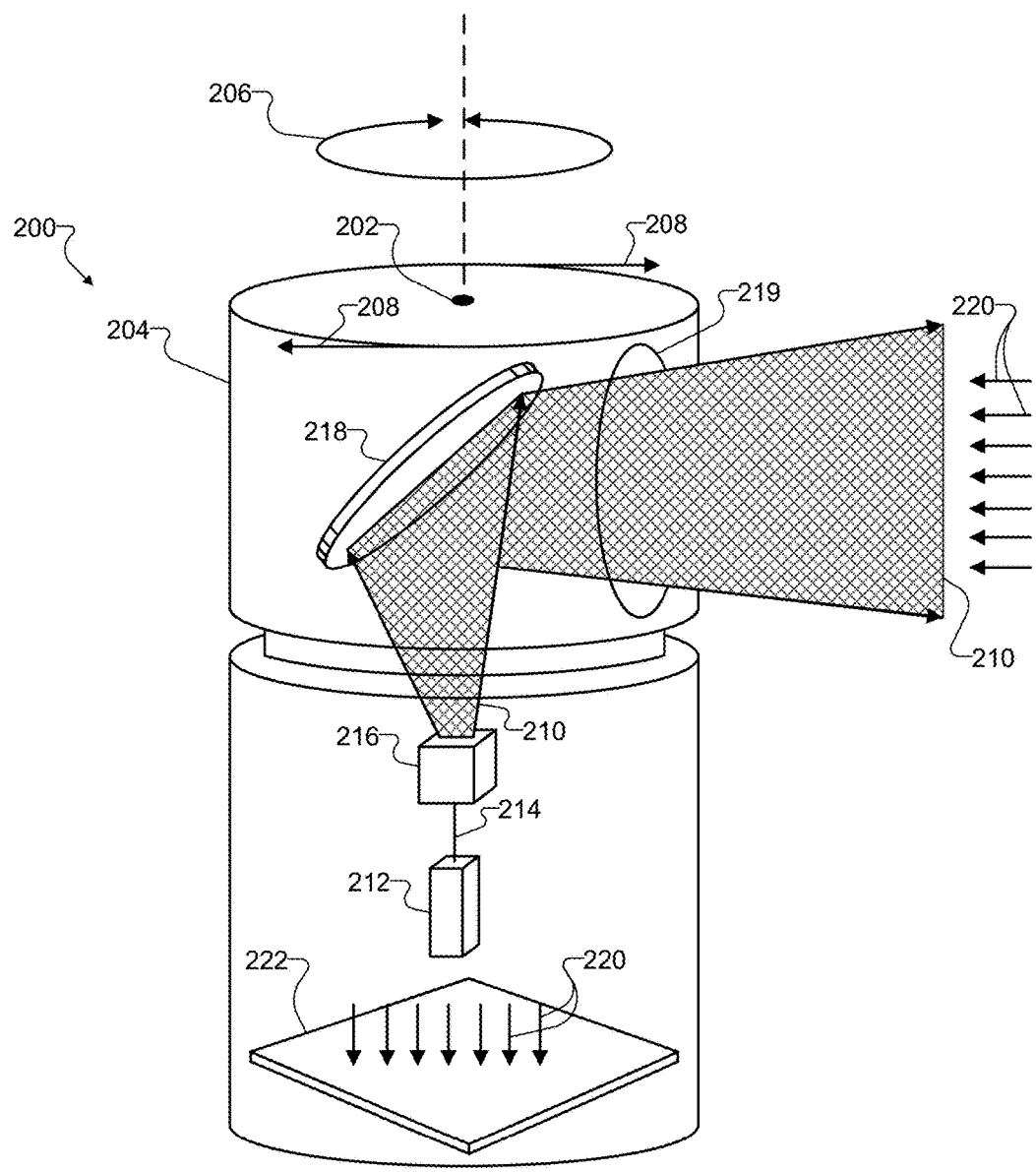
FIG. 2 illustrates an exemplary depth scanning device configured to detect depth data for surfaces included in a real-world scene according to principles described herein.

As mentioned above, system 100 may include a plurality of depth scanning devices configured to be disposed at different locations with respect to a real-world scene and configured to detect depth data by rotating respective scan heads so as to progressively aim respective scan fields to sweep across surfaces included within the real-world scene during a scan time period. To illustrate, FIG. 2 shows an exemplary depth scanning device 200 configured to detect depth data for surfaces included in a real-world scene. Various components and aspects of depth scanning device will now be described.

Depth scanning device 200 may be configured to be disposed at a particular location with respect to a real-world scene (not explicitly shown in FIG. 2). The location at which depth scanning device 200 is disposed may be associated with a vantage point 202 from which depth scanning device 200 may detect depth data for surfaces included within the real-world scene. For example, as illustrated, depth scanning device 200 may, from vantage point 202, rotate a scan head 204 around a rotation angle 206 and in a clockwise motion 208 so as to progressively aim a scan field 210 to sweep across the surfaces. While vantage point 202 is illustrated as an actual point on the top of depth scanning device 200 (i.e., a point coincident with an axis around which depth scanning device 200 rotates), it will be understood that vantage point 202 (as well as other vantage points described herein and illustrated in the figures) may be thought of as a more abstract concept (e.g., a perspective, a viewpoint, etc.) associated with a location at which depth scanning device 200 is disposed, rather than as a precise point in space.

It is noted that other depth scanning devices described herein will use a similar numbering scheme for like components and aspects of the depth scanning devices mentioned above to denote the similarity in form and/or function of these components and aspects to the form and/or function of the components and aspects described in detail in connection with depth scanning device 200. Specifically, other depth scanning devices included herein will be numbered in accordance with a respective figure number and a "00" suffix (e.g., depth scanning device "300" in FIG. 3), other vantage points will include a "02" suffix, other scan heads will include a "04" suffix, other rotation angles will include a "06" suffix, other rotation directions (e.g., clockwise or counterclockwise motions) will include a "08" suffix, and other scan fields will include a "10" suffix.

As shown, depth scanning device 200 also includes and/or illustrates other components and aspects that will be understood to be associated with other depth scanning devices described herein, but that will not be explicitly shown in connection with the other depth scanning devices. For instance, depth scanning device 200 includes a light source 212, a light beam 214, a beam spreader 216, a mirror 218, and a lens 219 for generating and emitting scan field 210 with a suitable extent (e.g., a vertical extent such as 20°-30° or another suitable angle allowing scan field 210 to capture the desired surfaces included within the real-world scene). As light from scan field 210 reflects from surfaces included in the real-world scene, FIG. 2 further illustrates that reflected light 220 may return to depth scanning device 200 to be received and detected by a light detector 222.

It will be understood that various other suitable components may be present in implementations of depth scanning device 200 and/or other depth scanning devices described herein, but may not be explicitly illustrated in FIG. 2. For example, processing resources (e.g., a processor, a memory, a communication interface with inputs and outputs, etc.) may be included within depth scanning device 200 to facilitate depth scanning device 200 in performing scanning operations with particular timing constraints (e.g., in synchronization with other depth scanning devices included with depth scanning device 200 within a depth scanning system) and/or to generate and output the depth data. For example, in certain implementations, depth scanning device 200 may include a synchronization subsystem (not explicitly shown) with an emitter for projecting a beam onto scan head 204 as scan head 204 rotates and a sensor for detecting one or more markers (e.g., reflective markers) disposed on scan head 204 as the one or more markers pass under the beam projected by the emitter. Depth scanning device 200 may further include processing resources configured to control the rotation of scan head 204 based on feedback from the sensor. For instance, the feedback may facilitate the synchronization subsystem in determining when each scan operation (e.g., each new rotation of scan head 204) begins, how long each scan operation takes, and so forth. Thus, using the feedback, the synchronization subsystem may receive a synchronization signal (e.g., in the form of periodic pulses from a master clock or the like) and ensure that rotations of scan head 204 remain in synchronization with the master clock (i.e., thereby remaining in synchronization with other depth scanning devices in the depth scanning system).

In operation, depth scanning device 200 may, in some examples, operate by generating and emitting scan field 210 and using a time-of-flight depth detection technique to determine depth data for surfaces based on how long it takes for light included within scan field 210 to reflect back from the surfaces to be received at light detector 222. As such, in certain examples, depth scanning device may be implemented as a LIDAR device configured to detect the depth data based on a time of flight of a laser pulse emitted by the LIDAR device and that reflects from the surfaces included within the real-world scene to be detected by the LIDAR device from vantage point 202.

More specifically, light source 212 may be a laser (e.g., a visible light laser, an infrared laser, etc.) or another suitable light source configured to generate a pulse of electromagnetic radiation configured to reflect back from various points on surfaces of objects based on the depth (i.e., the distance from depth scanning device 200) of the points on the surfaces. Accordingly, light beam 214 may be a laser beam (e.g., a short laser beam pulse) or another suitable pulse of light generated by light source 212. Beam spreader 216 may be used, along with lens 219, to shape scan field 210 such that multiple points along a surface may be detected at once. For example, beam spreader 216 may spread a laser beam (which may be a small point) into a linear scan field such as scan field 210 that can sweep over objects in one direction (e.g., horizontally, vertically, etc.) to detect depth data for all the points on the surfaces of the objects visible from vantage point 202 and that lie within an angle (e.g., a scan height, a scan width, etc.) covered by scan field 210.

In order to progressively aim (e.g., sweep, scan, etc.) scan field 210 over the surfaces, scan head 204 may include mirror 218, which is included within scan head 204 and is configured at an angle allowing mirror 218 to reflect scan field 210 out of the scan head (e.g., through lens 219, which may also be built into scan head 204 and may be configured to treat, spread, or otherwise process the light of scan field 210) as scan head 204 rotates in clockwise motion 208. As scan head 204 rotates, this causes scan field 210 to progressively aim over the surfaces included within rotation angle 206 during a scan time period (e.g., during the course of a single rotation of scan head 204 over rotation angle 206). In some examples, rotation angle 206 may be 360°, such that scan head 204 spins in complete rotations to capture depth data surrounding depth scanning device 200 in all directions along a plane (e.g., to the left, right, front, and back of depth scanning device 200). In other examples, as will be described and illustrated below, rotation angle 206 may be less than 360°, such that scan head 204 does not spin or complete entire rotations, but rather detects depth data within a certain rotation angle (e.g., a 90° angle) to the exclusion of detecting depth data of other surfaces surrounding depth scanning device 200.

Because reflection times are limited by the speed of light, a frequency at which depth scanning of a real-world scene is performed may be limited. Specifically, as scan head 204 progressively rotates to scan each degree of the real-world scene included in rotation angle 206, light included in scan field 210 must have time to travel from depth scanning device 200 to reflect off the surfaces in the real-world scene and to return to depth scanning device 200 as reflected light 220 to be detected at light detector 222 before scan head 204 has significantly rotated so as to block reflected light 220. Accordingly, while it may be possible for depth scanning device 200 to complete several scan cycles (e.g., complete rotations) per second (e.g., ten to twenty rotations per second), it may not be possible for depth scanning device 200 to scan the real-world scene with an arbitrarily high frequency due to physical limits such as the speed of light and the size of a particular real-world scene (e.g., the depths of the surfaces in the real-world scene with respect to vantage point 202). Fortunately, as will be described below, systems and methods described herein may allow depth scanning devices to perform as efficiently as possible to provide high levels of performance in spite of physical limitations that may constrain the depth scanning devices.

Figure 3:
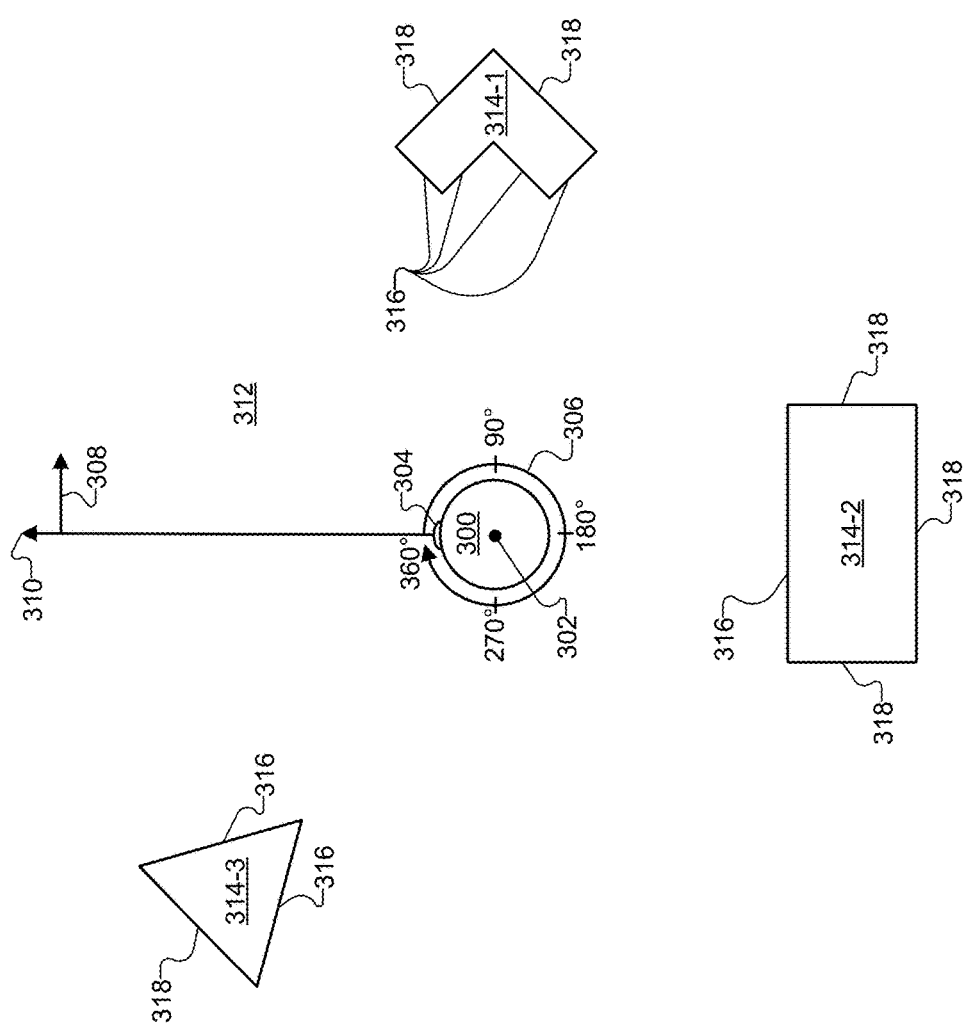
FIG. 3 illustrates a top view of an exemplary configuration in which an exemplary depth scanning device performs outward-looking depth scanning of an exemplary real-world scene to detect depth data for surfaces included in the real-world scene according to principles described herein.

FIG. 3 illustrates a top view of an exemplary configuration in which an exemplary depth scanning device 300 performs outward-looking depth scanning of an exemplary real-world scene to detect depth data for surfaces included in the real-world scene. Depth scanning device 300 may be similar or the same as depth scanning device 200 and, as such, may include various similar components and aspects as depth scanning device 200 that are numbered in like manner as depth scanning device 200, as described above. Specifically, as shown in FIG. 3, depth scanning device 300 may be located at a location associated with a vantage point 302, and may have a scan head 304 (the orientation of which is illustrated in FIG. 3 by a small bump representing a lens included on scan head 304 similar to lens 219) that rotates around a rotation angle 306 in a clockwise motion 308 so as to progressively aim a scan field 310 to sweep across surfaces included in a real-world scene 312. The operation of depth scanning device 300 may be similar or identical to the operation of depth scanning device 200.

As shown, rotation angle 306 over which depth scanning device 300 may perform depth scanning may be a rotation angle of 360°. As such, depth scanning device 300 may detect depth data of various surfaces of various objects 314 (e.g., objects 314-1 through 314-3) included within real-world scene 312 and that surround vantage point 302 on various sides. For example, various surfaces 316 of objects 314 may all be detectable by depth scanning device 300 from vantage point 302 as scan head 304 rotates all the way around rotation angle 306. In this sense, depth scanning device 300, as arranged in the configuration of FIG. 3, may be said to perform "outward-looking" depth scanning because depth data is detected in all directions looking outward from vantage point 302.

Because objects 314 may each have one or more additional surfaces 318 that are not detectable from vantage point 302, however, it will be understood that depth scanning device 300 may not be able to detect enough depth data by itself and in the outward look depth scanning configuration to fully model objects 314. For example, while a single perspective depth map may be generated that represents surfaces 316, additional data may be needed to represent surfaces 318 (e.g., and/or to represent surfaces 316 in more detail) within the depth map.

Figure 4:
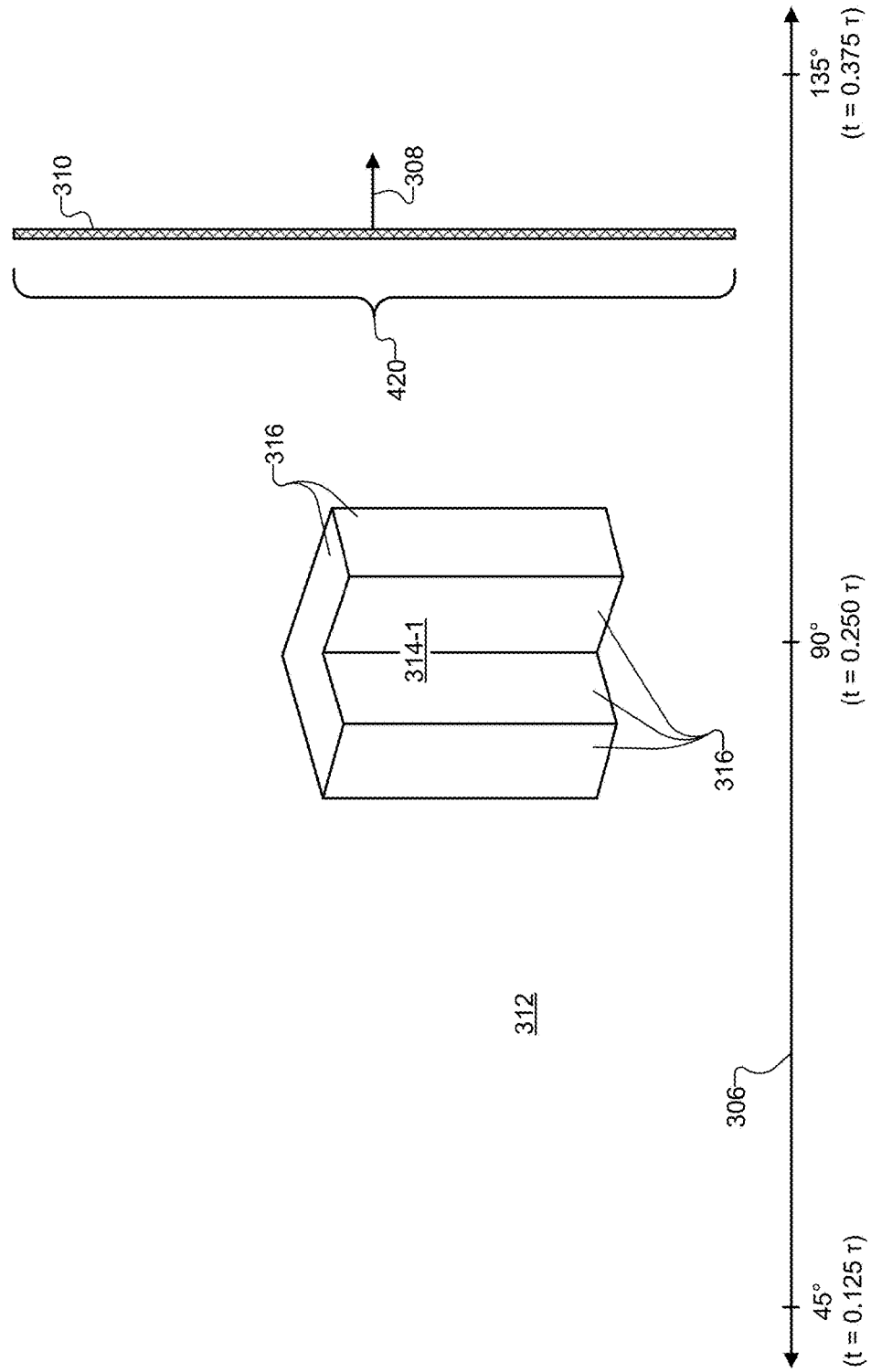
FIG. 4 illustrates a perspective view of a portion of the exemplary configuration illustrated in FIG. 3 according to principles described herein.

To further illustrate the outward looking depth scanning performed by depth scanning device 300, FIG. 4 shows a perspective view of a portion of the configuration illustrated in FIG. 3. Specifically, as shown by the segment of rotation angle 306 labeled beneath the perspective view of real-world scene 312 including object 314-1, FIG. 4 illustrates a portion of real-world scene 312 detected by depth scanning device 300 as scan field 310 is progressively aimed from approximately 45° to approximately 135°. As shown, real-world scene 312 is scanned in clockwise motion 308, which equates to a left to right movement from the perspective shown in FIG. 4, since clockwise motion 308 is clockwise with respect to the top view of FIG. 3. (It will be understood that a clockwise motion with respect to a view from beneath depth scanning device 300 in FIG. 3 would equate to a right to left movement from the perspective shown in FIG. 4.)

As shown, scan field 310 may be represented as a thin line that covers a certain vertical extent 420 (e.g., a 20°-30° vertical extent in certain implementations). In this example, vertical extent 420 is tall enough for the entirety of object 314-1 (i.e., all of detectable surfaces 316 associated with object 314-1) to be scanned as scan field 310 sweeps over object 314-1 in accordance with clockwise motion 308. Accordingly, as shown, surfaces 316 of object 314-1 have all been scanned as scan field 310 sweeps along rotation angle 306. It will be understood, however, that other surfaces of object 314-1 (e.g., surfaces 318 beneath and/or on the back side of object 314-1 that are not visible from the perspective of FIG. 4 or from vantage point 302) may not be detected by the outward-looking depth scan illustrated in FIGS. 3 and 4.

Also shown in FIG. 4 are approximate times at which different parts of real-world scene 312 (e.g., including object 314-1) are detected with respect to a given scan time period. Specifically, the scan time period may be represented by the Greek letter "$\tau$" in FIG. 4 and the time at which a particular portion of rotation angle 306 is detected may be represented by a "t" for "time." Accordingly, as shown, the portion of real-world scene 312 at 45° along rotation angle 306 may be detected at approximately 12.5% of the way through a given scan time period (i.e., $t=0.125\ \tau$), the portion of real-world scene 312 at 90° along rotation angle 306 may be detected at approximately 25.0% of the way through a given scan time period (i.e., $t=0.250\ \tau$), and the portion of real-world scene 312 at 135° along rotation angle 306 may be detected at approximately 37.5% of the way through a given scan time period (i.e., $t=0.375\ \tau$). Thus, in an example where depth scanning device 300 has a frequency of 20 Hz (i.e., completes 20 full rotations per second) such that the scan time period of depth scanning device 300 is 50 milliseconds ("ms"), depth scanning device 300 may scan object 314-1 at approximately 25% of the way through the scan time period, or at approximately 12 or 13 ms after each particular scan cycle begins. Scan times will be represented in similar ways with respect to similar rotation angles in other figures illustrated below.

Figure 5:
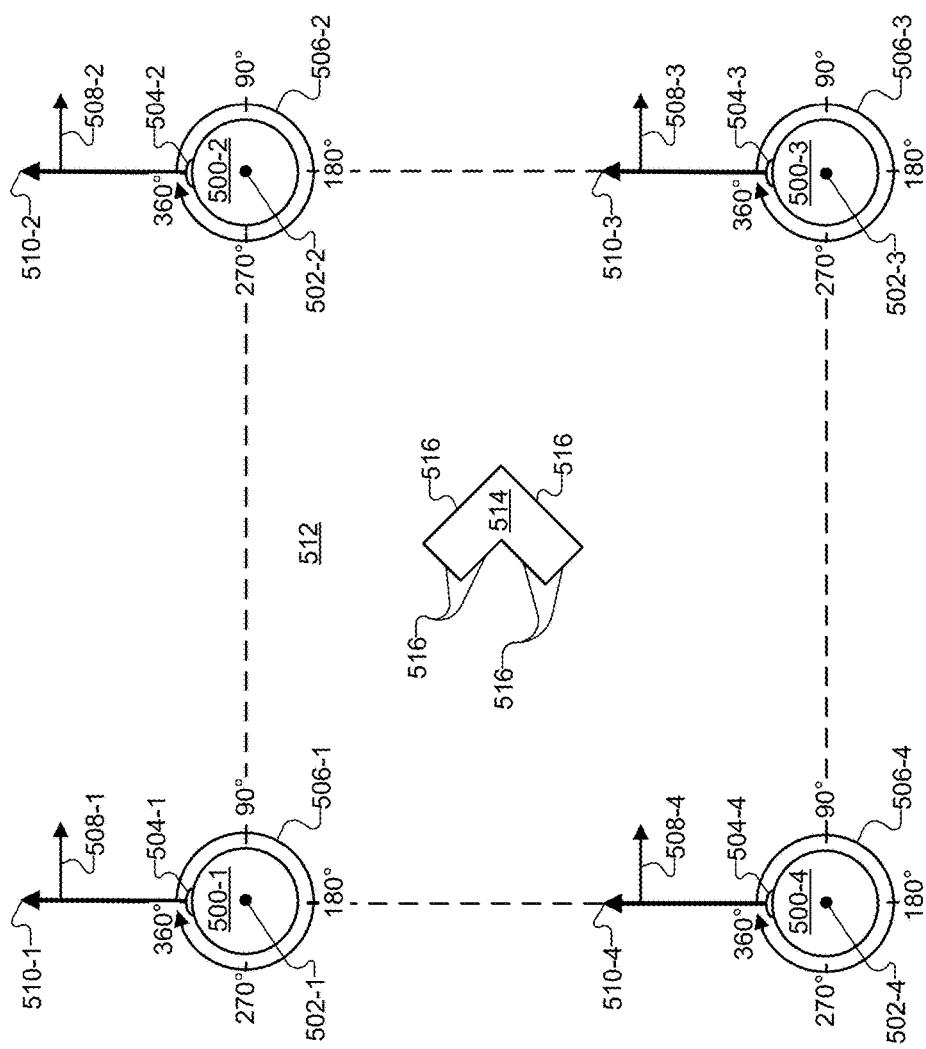
FIG. 5 illustrates a top view of an exemplary configuration in which an exemplary depth scanning system including a plurality of depth scanning devices performs inward-looking depth scanning of an exemplary real-world scene to detect depth data for surfaces included in the real-world scene according to principles described herein.

FIG. 5 illustrates a top view of an exemplary configuration in which an exemplary depth scanning system including a plurality of depth scanning devices performs inward-looking depth scanning of an exemplary real-world scene to detect depth data for surfaces included in the real-world scene. More particularly, FIG. 5 illustrates a depth scanning system that is an implementation of system 100 and that includes a plurality of depth scanning devices 500 (e.g. depth scanning devices 500-1 through 500-4). As with depth scanning devices 200 and 300, depth scanning devices 500 are disposed at respective locations associated with respective vantage points 502 (i.e., vantage points 502-1 through 502-4 of depth scanning devices 500-1 through 500-4, respectively). As further illustrated in FIG. 5, depth scanning devices 500 also include respective scan heads 504 (i.e., scan heads 504-1 through 504-4 of depth scanning devices 500-1 through 500-4, respectively) that rotate around respective rotation angles 506 (i.e., rotation angles 506-1 through 506-4 of depth scanning devices 500-1 through 500-4, respectively) in respective clockwise motions 508 (i.e., clockwise motions 508-1 through 508-4 of depth scanning devices 500-1 through 500-4, respectively) so as to progressively aim respective scan fields 510 (i.e., scan fields 510-1 through 510-4 of depth scanning devices 500-1 through 500-4) to sweep across surfaces included in a real-world scene 512.

The operation of depth scanning devices 500 may be similar or identical to the operation of depth scanning devices 200 and/or 300. However, whereas depth scanning device 300 was arranged in an outward-looking configuration where only surfaces 316 of objects 314 were detectable from vantage point 302, depth scanning devices 500 in FIG. 5 are arranged in an inward-looking configuration such that depth data of an object 514 included within real-world scene 512 may be detected from multiple perspectives so as to detect depth data for all surfaces 516 of object 514. Specifically, for example, while depth scanning devices 500-1 and/or 500-4 may, from vantage points 502-1 and 502-4, respectively, be able to detect depth data for surfaces 516 on the left side of object 514 (while being unable to detect depth data for the other surfaces 516), depth scanning devices 500-2 and 500-3 may, from vantage points 502-2 and 502-3, respectively, be able to detect depth data for the surfaces 516 on the right side of object 514 (while being unable to detect depth data for the surfaces 516 on the left side that are detected by depth scanning devices 500-1 and 500-4).

Like depth scanning device 300, each of depth scanning devices 500 may scan around respective 360° rotation angles 506 (i.e., full rotations) and, as such, may individually be described as being outward-looking depth scanning devices. However, because each of depth scanning devices 500 overlap to scan a common area bounded by the locations at which depth scanning devices 500 are disposed, depth scanning devices 500 may collectively be said to perform "inward-looking" depth scanning within this common area. As shown in FIG. 5, this common area may contain real-world scene 512 and, as such, the implementation of system 100 that includes depth scanning devices 500 may perform inward-looking depth scanning of real-world scene 512. Unlike with outward-looking depth scanning, objects and surfaces scanned using inward-looking depth scanning techniques may be modeled more completely (e.g., from multiple perspectives around real-world scene 512). For example, rather than a single perspective depth map such as that described above in connection with surfaces 316 of real-world scene 312, the inward-looking depth scanning shown in FIG. 5 may detect sufficient data to generate a multiple perspective depth map that captures all of surfaces 516, or at least more of surfaces 516 than are detectable from any single vantage point.

As described above, multiple depth scanning devices may be synchronized together or otherwise configured to operate in phase with one another. As used herein, two depth scanning devices (e.g., such as two of depth scanning devices 500) may be "phase matched" or, in other words, may be said to scan, rotate, or otherwise operate "in phase" with one another if respective scan time periods of the two depth scanning devices are aligned so that one depth scanning device always performs a certain part of its depth scan at a same moment that the other depth scanning device performs a certain part its depth scan. For example, as shown in FIG. 5, each of depth scanning devices 500 may operate in phase with one another if each of the depth scanning devices operates using a same scan time period. Specifically, for instance, if each of depth scanning devices 500 are aiming in an identical direction (i.e., toward the top of the page) at a particular moment, as shown, and if each of the depth scanning devices completes a full rotation in 50 ms, depth scanning devices 500 will remain synchronized and in phase with one another indefinitely as each rotates 20 times per second in a synchronous fashion.

In phase depth scanning devices may not necessarily always be aiming in identical directions or rotating in identical directions. For example, depth scanning devices that aim in opposite directions at a same moment in time and that rotate in opposite directions (e.g., one rotating clockwise and the other rotating counterclockwise in reference to a common reference point such as a reference point above the depth scanning devices) may still rotate in phase with one another if both rotate at a same frequency (e.g., each rotation occurring over a same scan time period). Additionally, in certain examples, depth scanning devices 500 may be phase matched if one depth scanning device 500 operates at a frequency that is a multiple of a frequency of another depth scanning device 500. For example, if depth scanning device 500-1 completes two rotations for every rotation of depth scanning device 500-2, both depth scanning devices may still be said to be synchronized and operating in phase with one another in certain implementations.

Depth scanning devices such as depth scanning devices 500 may be synchronized in any suitable manner. For example, as described above with respect to depth scanning device 200 in FIG. 2, depth scanning devices 500 may each include a respective synchronization subsystem whereby a synchronization signal (e.g., a timed series of pulses generated by a master clock or the like) may be received by each depth scanning device 500 and used to maintain synchronization between the depth scanning devices 500. Additionally or alternatively, a synchronization signal including data representative of one or more timecodes (e.g., a timecode representative of the current time, one or more timecodes representative of scheduled times that scanning operations are to be initiated, etc.) may be provided to each depth scanning device 500 and used to facilitate synchronization between depth scanning devices 500, to mark depth data detected by depth scanning devices 500 in order to facilitate correlation of the depth data with depth data detected by other depth scanning devices, and/or for any other purpose as may serve a particular implementation.

Depth scanning devices 500 may be arranged and synchronized so as to perform inward-looking, phase-matched depth scanning of real-world scene 512. However, even while the configuration of FIG. 5 may provide many benefits such as sufficient data to generate full models of multiple surfaces 516 of object 514 and/or other objects included within real-world scene 512, the configuration of FIG. 5 may still leave room for improvement. First, because of the way depth scanning devices 500 are synchronized, surfaces included within real-world scene 512 (e.g., surfaces 516 of object 514) may be scanned by different depth scanning devices 500 at significantly different times within each scan time period. This may reduce the usefulness and/or accuracy of a 4D depth map of the surfaces of real-world scene 512, especially if objects within real-world scene 512 are moving significantly on the time scale of the scan time period of depth scanning devices 500. Second, while real-world scene 512 may be contained within (i.e., bounded by) a quadrilateral formed by the locations at which each depth scanning device 500 is disposed (e.g., the dotted rectangle shown around real-world scene 512 in FIG. 5), because depth scanning devices 500 are each configured to rotate around respective 360° rotation angles 506, approximately three fourths of each depth scan cycle of each depth scanning device 500 may be unused or wasted in implementations where only surfaces included within real-world scene 512 are being detected. In other words, each depth scanning device 500 may spend about three fourths of each scan time period scanning an irrelevant area outside of real-world scene 512, resulting in significant waste and inefficiency.

Figure 6:
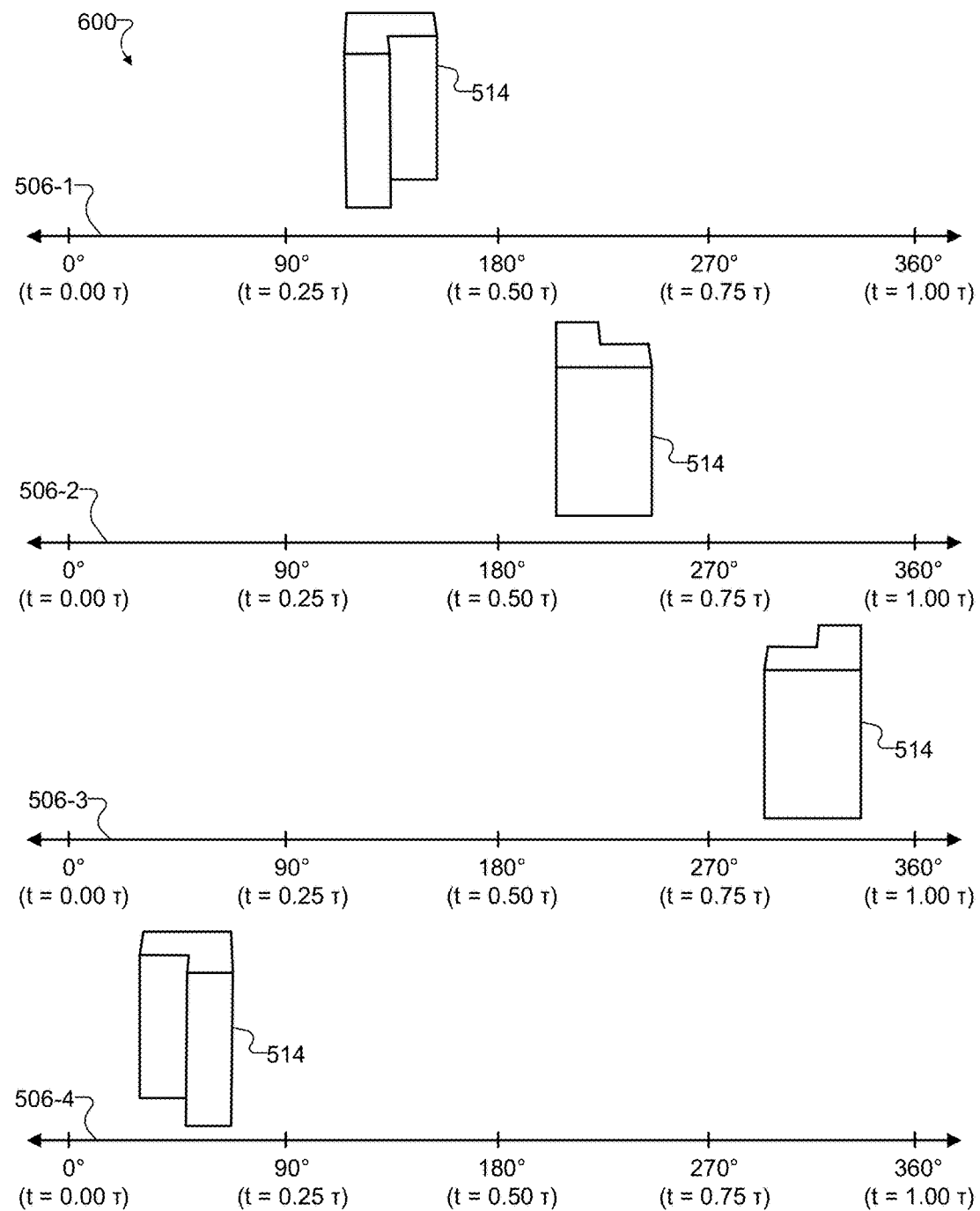
FIG. 6 illustrates exemplary depth scan details for a single scan time period for each of the depth scanning devices illustrated in FIG. 5 according to principles described herein.

Effects of both of these inefficiencies are illustrated in FIG. 6. Specifically, FIG. 6 shows exemplary depth scan details for a single scan time period for each of depth scanning devices 500. Similar to the perspective view illustrated in FIG. 4, FIG. 6 illustrates timing of when surfaces of an object (i.e., object 514) are scanned with respect to the scan time period of an entire scan cycle (i.e., represented by "$\tau$"). Thus, as shown in FIG. 6, depth scanning device 500-1 scans around rotation angle 506-1 (i.e., from 0° at the beginning of the scan time period (t=0.00 $\tau$) to 360° at the end of the scan time period (t=1.00 $\tau$)), including scanning surfaces of object 514 and other surfaces included within real-world scene 512 at some point between 90° (e.g., t=0.25 $\tau$) and 180° (e.g., t=0.50 $\tau$). Meanwhile, depth scanning devices 500-2 through 500-4 also scan around respective rotations angles 506 (i.e., rotation angles 506-2 through 506-4, respectively), but, because of the respective locations at which they are disposed, scan surfaces of object 514 and other surfaces included within real-world scene 512 at different parts of their respective rotation angles 506 and at different times during the scan time period. For example, as shown, depth scanning device 500-2 scans surfaces of object 514 and other surfaces included within real-world scene 512 at some point between 180° (e.g., t=0.50 $\tau$) and 270° (e.g., t=0.75 $\tau$), depth scanning device 500-3 scans surfaces of object 514 and other surfaces included within real-world scene 512 at some point between 270° (e.g., t=0.75 $\tau$) and 360° (e.g., t=1.00 $\tau$), and depth scanning device 500-4 scans surfaces of object 514 and other surfaces included within real-world scene 512 at some point between 0° (e.g., t=0.00 $\tau$) and 90° (e.g., t=0.25 $\tau$).

If, in a particular example, the scan frequency of depth scanning devices 500 is 20 Hz and the scan time period is 50 ms (i.e., T=50 ms), FIG. 6 illustrates the first inefficiency of the configuration of FIG. 5. That is, depth data for certain surfaces 516 of object 514 may be detected (e.g., by depth scanning device 500-4) early on in the scan time period (e.g., before t=0.25 $\tau$), while depth data for other surfaces 516 of object 514 may be detected (e.g., by depth scanning device 500-3) much later in the scan time period (e.g., after t=0.75 $\tau$). Specifically, for example, the surfaces 516 detected by depth scanning device 500-4 may be detected at approximately t=6 ms, while the surfaces 516 detected by depth scanning device 500-3 may not be detected until approximately t=44 ms, 38 ms later. If object 514 has moved during the 38 ms period or if the surfaces 516 have otherwise changed, this scan time discrepancy may make result in depth data that is inaccurate or otherwise less than ideal.

Additionally, as illustrated in FIG. 6, three fourths of each rotation angle 506-1 includes depth scans where no relevant surfaces (i.e., surfaces included within real-world scene 512) are detected. Specifically, as shown, no relevant surfaces are detected by depth scanning device 500-1 from 0° to 90° or from 180° to 360°, no relevant surfaces are detected by depth scanning device 500-2 from 0° to 180° or from 270° to 360°, no relevant surfaces are detected by depth scanning device 500-3 from 0° to 270°, and no relevant surfaces are detected by depth scanning device 500-4 from 90° to 360°. As such, the time associated with these portions of the scan time period, as well as the depth data detected during these portions, may amount to time inefficiently spent and data purposelessly detected to the extent that system 100 is configured to scan depth data of real-world scene 512. Each of the sources of the inefficiencies illustrated in FIG. 6 will now be addressed.

Figure 7:
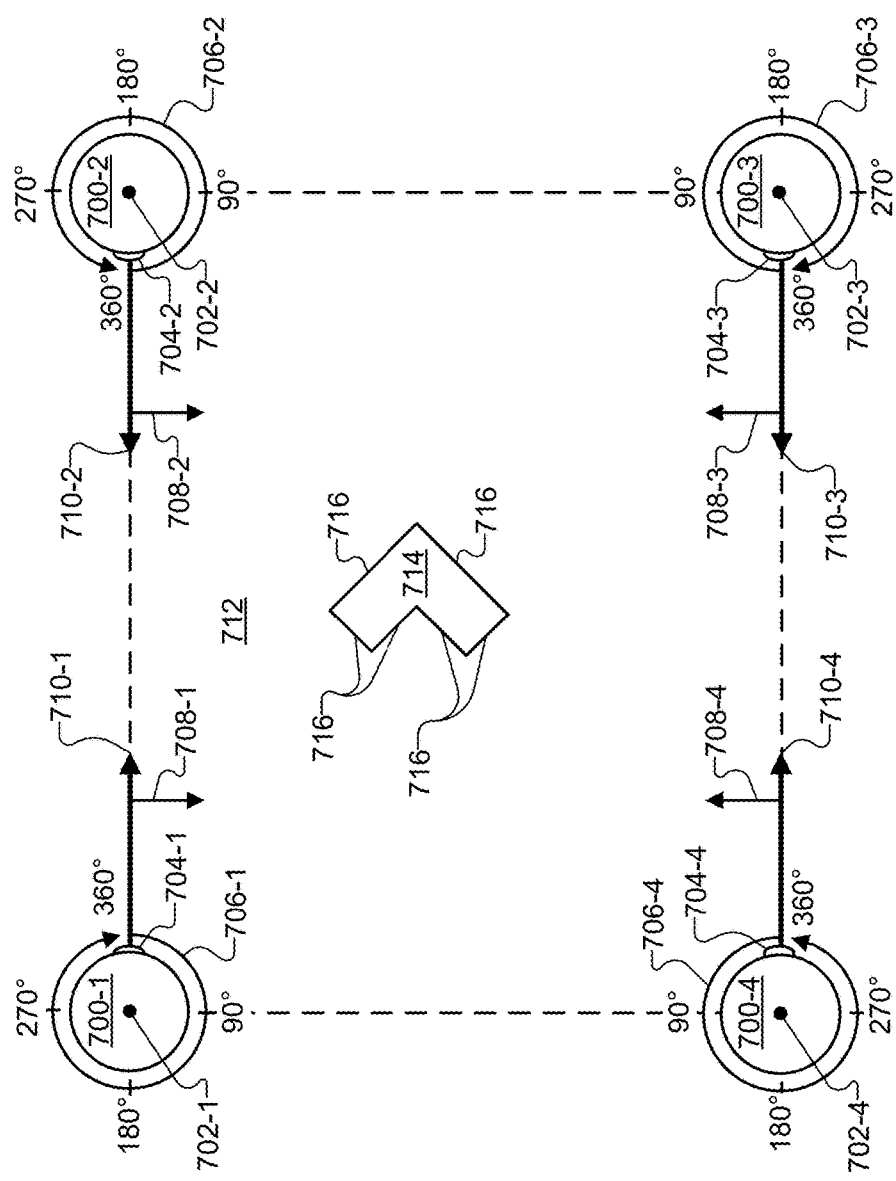
FIG. 7 illustrates a top view of another exemplary configuration in which an exemplary depth scanning system including a plurality of depth scanning devices performs inward-looking depth scanning of an exemplary real-world scene to detect depth data for surfaces included in the real-world scene according to principles described herein.

First, FIG. 7 illustrates an implementation of system 100 that addresses the inefficiency caused by the scan time discrepancy of when, within the scan time period, the surfaces included within the real-world scene are detected by different inward-looking depth scanning devices. Specifically, FIG. 7 illustrates a top view of another exemplary configuration in which an exemplary depth scanning system (e.g., another implementation of system 100) including a plurality of depth scanning devices performs inward-looking depth scanning of an exemplary real-world scene to detect depth data for surfaces included in the real-world scene.

Similar to the depth scanning system of FIG. 5, the depth scanning system illustrated in FIG. 7 includes a plurality of depth scanning devices 700 disposed at respective locations associated with respective vantage points 702 (i.e., vantage points 702-1 through 702-4). Additionally, as shown, depth scanning devices 700 also include respective scan heads 704 (i.e., scan heads 704-1 through 704-4) that rotate around respective rotation angles 706 (i.e., rotation angles 706-1 through 706-4) in respective motions 708 (i.e., clockwise motions 708-1 and 708-3, and counterclockwise motions 708-2 and 708-4) so as to progressively aim respective scan fields 710 (i.e., scan fields 710-1 through 710-4) to sweep across surfaces included in a real-world scene 712. As with the configuration of FIG. 5, the inward-looking configuration of depth scanning devices 700 in FIG. 7 allows multiple surfaces of an object 714 (i.e., surfaces 716) to be scanned to detect depth data for the surfaces.

To this end, the operation of depth scanning devices 700 may be similar to the operation of depth scanning devices 500 in FIG. 5. However, whereas depth scanning devices 500 were synchronized so as to aim respective scan fields 510 in parallel directions at the same time throughout the scan time period, depth scanning devices 700 in FIG. 7 are arranged in a different type of inward-looking configuration. Specifically, as shown, at a particular moment during each scan time period (e.g., at the beginning or end of each scan time period, at a point in the middle of each scan time period, etc.), certain scan heads 704 are configured to aim at one another. For example, depth scanning devices 700-1 and 700-2 are shown to have this type of in-phase rotation. At the moment illustrated in FIG. 7 (e.g., a moment at the beginning or end of the scan time period, a moment in the middle of the scan time period, etc.), scan field 710-1 of depth scanning device 700-1 is aimed at vantage point 702-2 of depth scanning device 700-2 at the same time that scan field 710-2 of depth scanning device 700-2 is aimed at vantage point 702-1 of depth scanning device 700-1. As shown, depth scanning devices 700-4 and 700-3 are phase matched with one another in a similar way.

Moreover, as mentioned above, depth scanning devices 700 in FIG. 7 do not all rotate in the same direction as do depth scanning devices 500 in FIG. 5. Specifically, as shown, while scan heads 704-1 of depth scanning device 700-1 and 704-3 of depth scanning device 700-3 rotate in a clockwise fashion from the perspective of a common reference point above scan heads 704 (i.e., clockwise motions 708-1 and 708-3, respectively), scan heads 704-2 of depth scanning device 700-2 and 704-4 of depth scanning device 700-4 rotate in a counterclockwise fashion from the perspective of the common reference point (i.e., counterclockwise motions 708-2 and 708-4, respectively). As a result, depth scanning devices 700-1 and 700-4 are also phase matched such that scan field 710-1 of depth scanning device 700-1 will be aimed at vantage point 702-4 of depth scanning device 700-4 at a same moment (e.g., a later moment in the scan time period than illustrated by FIG. 7) that scan field 710-4 of depth scanning device 700-4 is aimed at vantage point 702-1 of depth scanning device 700-1. In like manner, depth scanning devices 700-2 and 700-3 are also phase matched with one another in a similar way.

Accordingly, the configuration of FIG. 7 illustrates an example of inward-looking, phase-matched depth scanning of a real-world scene using a depth scanning system having four depth scanning devices. Specifically, the depth scanning system of FIG. 7 includes depth scanning device 700-1 configured to be disposed at a first location with respect to real-world scene 712 (i.e., a location at a first corner of a quadrilateral in which real-world scene 712 is contained) and configured to detect depth data for surfaces 716 included within real-world scene 712 from vantage point 702-1 of the first location by rotating scan head 704-1 in clockwise motion 708-1 so as to progressively aim scan field 710-1 to sweep across surfaces 716 during a scan time period. The depth scanning system of FIG. 7 further includes depth scanning device 700-2 configured to be disposed at a second location with respect to real-world scene 712 (i.e., a location at a second corner of the quadrilateral adjacent to the first corner) and configured to detect depth data for surfaces 716 from vantage point 702-2 of the second location by rotating scan head 704-2 in phase with the rotation of scan head 704-1 and in counterclockwise motion 708-2 so as to progressively aim scan field 710-2 to sweep across surfaces 716 during the scan time period.

The depth scanning system illustrated in the example of FIG. 7 further includes depth scanning device 700-3 configured to be disposed at a third corner of the quadrilateral adjacent to (i.e., sharing a side with) the second corner and non-adjacent to (i.e., diagonal from and not sharing a side with) the first corner. Depth scanning device 700-3 may be configured to detect depth data for surfaces 716 from vantage point 702-3 of the third corner by rotating scan head 704-3 in phase with the rotation of scan heads 704-1 and 704-2 in clockwise motion 708-3 so as to progressively aim scan field 710-3 to sweep across surfaces 716 during the scan time period. Additionally, the depth scanning system of FIG. 7 includes depth scanning device 700-4 configured to be disposed at a fourth corner of the quadrilateral adjacent to the third corner and non-adjacent to the second corner and configured to detect depth data for surfaces 716 from vantage point 702-4 of the fourth corner by rotating scan head 704-4 in phase with the rotation of the other scan heads 704 and in counterclockwise motion 708-4 so as to progressively aim scan field 710-4 to sweep across surfaces 716 during the scan time period.

As shown in FIG. 7 and as described above, the in-phase rotations of scan heads 704-1 and 704-2 may be configured such that scan field 710-1 aims at vantage point 702-2 at a same moment during the scan time period when scan field 710-2 aims at vantage point 702-1. Moreover, the in-phase rotations of scan heads 704-3 and 704-4 are configured such that scan field 710-3 aims at vantage point 702-4 at a same moment during the scan time period when scan field 710-4 aims at vantage point 702-3. The in-phase rotations of scan heads 704-1 and 704-4 are also configured such that scan field 710-1 aims at vantage point 702-4 at a same moment during the scan time period when scan field 710-4 aims at vantage point 702-1. Additionally, the in-phase rotations of scan heads 704-2 and 704-3 are configured such that scan field 710-2 aims at vantage point 702-3 at a same moment during the scan time period when scan field 710-3 aims at vantage point 702-2.

While the example illustrated in FIG. 7 illustrates a real-world scene contained within a quadrilateral (e.g., a rectangle, a parallelogram, a rhombus, etc.) that is bounded by four depth scanning devices 700 disposed at the corners of the quadrilateral, it will be understood that other numbers of depth scanning devices bounding other shapes containing real-world scenes may also be employed in certain implementations. For example, a depth scanning system including two depth scanning devices may perform inward-looking, phase-matched depth scanning of a real-world scene located between the two depth scanning devices; a depth scanning system including three depth scanning devices may perform inward-looking, phase-matched depth scanning of a real-world scene contained within a triangle bounded at the corners by the three depth scanning devices; a depth scanning system including more than four depth scanning devices may perform inward-looking, phase-matched depth scanning of a real-world scene contained within these or other shapes bounded by the depth scanning devices in any suitable manner; and so forth as may serve a particular implementation.

Figure 8:
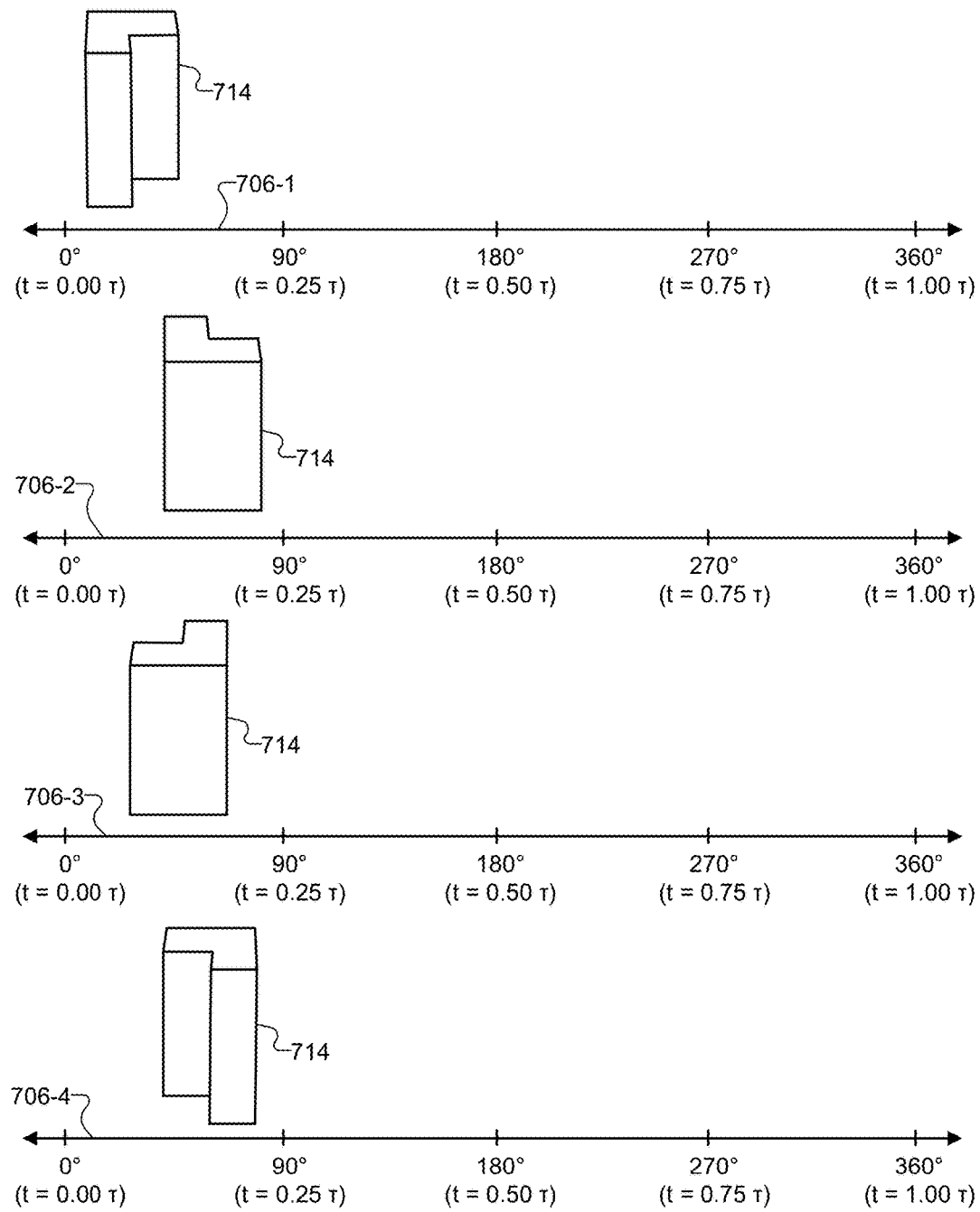
FIG. 8 illustrates exemplary depth scan details for a single scan time period for each of the depth scanning devices illustrated in FIG. 7 according to principles described herein.

FIG. 8 illustrates how the configuration of FIG. 7 improves the synchronicity with which the surfaces included within a real-world scene are scanned as compared, for example, with the configuration of FIG. 5. Specifically, FIG. 8 illustrates exemplary depth scan details for a single scan time period for each of depth scanning devices 700 in a similar format to the depth scan details illustrated in FIG. 6. As with the depth scan details illustrated in FIG. 6, FIG. 8 illustrates timing of when surfaces of an object (i.e., object 714) are scanned with respect to the scan time period of an entire scan cycle (i.e., represented by "$\tau$"). However, whereas FIG. 6 illustrates that the configuration of depth scanning devices 500 in FIG. 5 caused each depth scanning device 500 to scan the surfaces of real-world scene 512 (e.g., including surfaces of object 514) at significantly differing times within the scan time period (e.g., with a scan time discrepancy of up to approximately 38 ms in the given example), FIG. 8 shows the significant improvement that the configuration of depth scanning devices 700 in FIG. 7 may provide. Specifically, as shown in FIG. 8, each of depth scanning devices 700 may detect depth data for the surfaces within real-world scene 712 (e.g., including surfaces 716 of object 714) between 0° and 90° of the respective rotation angles 706 (i.e., rotation angles 706-1 through 706-4, respectively) and within the first 25% of the scan time period (i.e., prior to t=0.25 $\tau$). This is true regardless of where object 714 is located within real-world scene 712, although it will be noted that object 714 may be scanned by each depth scanning device 700 at slightly different points between 0° to 90° dependent on where object 714 is located within real-world scene 712.

As such, while there may still be a small amount of scan time discrepancy between when depth data for particular surface scanned by different depth scanning devices 700, the scan time discrepancy is significantly improved (i.e., reduced) in the example shown in FIG. 8 as compared to the example shown in FIG. 6. For instance, referring to the example described above where the scan time period is 50 ms, while FIG. 6 shows a scan time discrepancy for certain surfaces of upwards of 38 ms (i.e., approximately 75% of the total scan time period), FIG. 8 shows a scan time discrepancy that may be negligible for surfaces of object 714 (e.g., no more than a few milliseconds or a few percentage points of the total scan time period).

Figure 9:
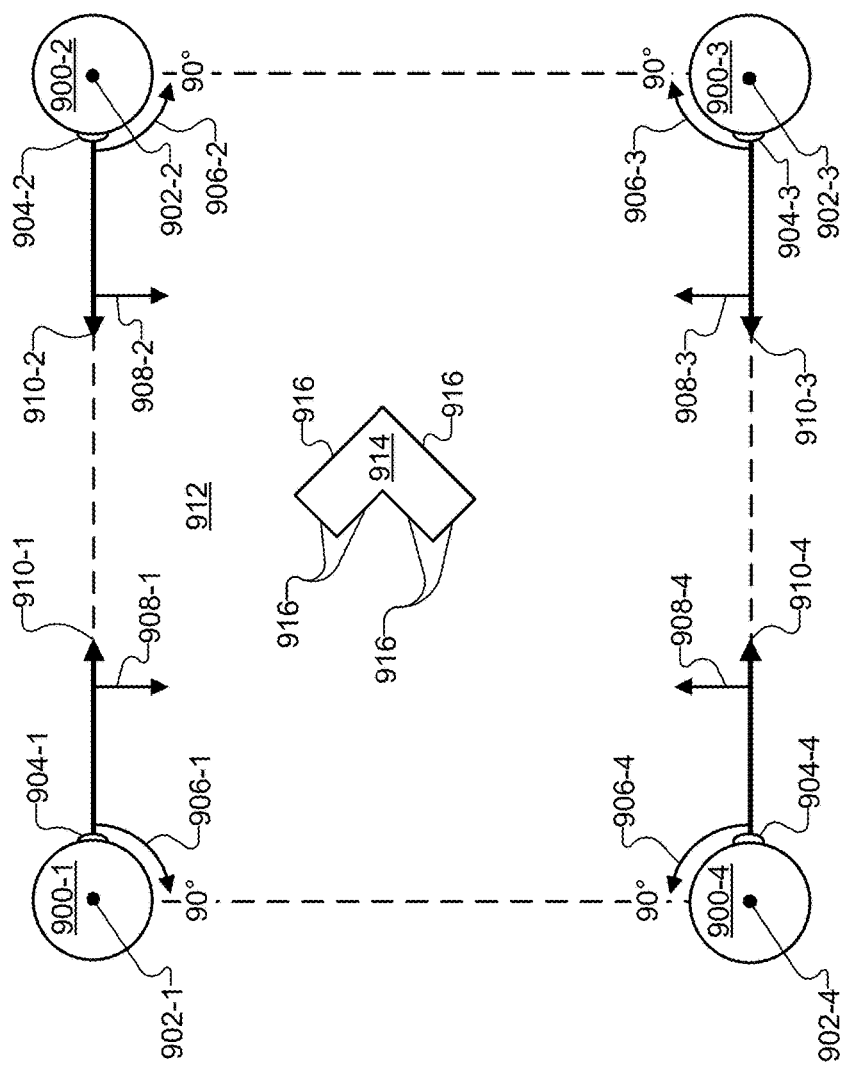
FIG. 9 illustrates a top view of yet another exemplary configuration in which an exemplary depth scanning system including a plurality of depth scanning devices performs inward-looking depth scanning of an exemplary real-world scene to detect depth data for surfaces included in the real-world scene according to principles described herein.

FIG. 9 illustrates an implementation of system 100 that addresses the wasted scanning that may arise when depth scanning devices included within an inward-looking configuration detect depth data along a 360° rotation angle in an outward-looking fashion. Specifically, FIG. 9 illustrates a top view of yet another exemplary configuration in which an exemplary depth scanning system (e.g., another implementation of system 100) including a plurality of depth scanning devices performs inward-looking depth scanning of an exemplary real-world scene to detect depth data for surfaces included in the real-world scene.

Similar to the depth scanning system of FIGS. 5 and 7, the depth scanning system illustrated in FIG. 9 includes a plurality of depth scanning devices 900 disposed at respective locations associated with respective vantage points 902 (i.e., vantage points 902-1 through 902-4). Additionally, as shown, depth scanning devices 900 also include respective scan heads 904 (i.e., scan heads 904-1 through 904-4) that rotate around respective rotation angles 906 (i.e., rotation angles 906-1 through 906-4) in respective motions 908 (i.e., clockwise motions 908-1 and 908-3, and counterclockwise motions 908-2 and 908-4) so as to progressively aim respective scan fields 910 (i.e., scan fields 910-1 through 910-4) to sweep across surfaces included in a real-world scene 912. As with the configurations of FIGS. 5 and 7, the inward-looking configuration of depth scanning devices 900 in FIG. 9 allows multiple surfaces of an object 914 (i.e., surfaces 916) to be scanned to detect depth data for the surfaces.

To this end, the operation of depth scanning devices 900 may be similar to the operation of depth scanning devices 500 in FIG. 5 and/or the operation of depth scanning devices 700 in FIG. 7. However, whereas depth scanning devices 500 and 700 were configured to complete full 360° rotations (i.e., to detect depth data along respective 360° rotation angles 506 and 706), each of depth scanning devices 900 in FIG. 9 are configured to rotate their respective scan heads 904 to sweep, during the scan time period, only across surfaces 916 that are included within respective rotation angles 906 that are less than 360°. Specifically, as shown, each depth scanning device 900 in the depth scanning system implementation of FIG. 9 is configured to sweep over the 90° segment that is associated with real-world scene 912 and not to sweep over the 270° segment that lies outside of real-world scene 912.

Because it may only take approximately one fourth of the time to scan over 90° rotation angles 906 as it takes to scan over 360° rotation angles 506 and/or 706, depth scanning devices 900 may have time to perform additional depth scanning of real-world scene 912 that may not be possible otherwise. For example, by using a mechanism to "snap" each respective scan head 904 and/or components within them (e.g., a rotating mirror such as mirror 218 shown specifically in connection with depth scanning device 200) back to a starting position after completing a 90° scan cycle (i.e., to continually snap back 90° rather than rotating around 360°), depth scanning devices 900 may perform several (e.g., up to four) depth scans of real-world scene 912 in the time that it might otherwise take to perform a full 360° depth scan such as those shown in FIGS. 5 and 7. In other examples, depth scanning devices 900 may use a mechanism, such as a stepper motor, controller, actuator, etc. to reverse the motion of the scan head from clockwise to counterclockwise and back again (e.g., similar to a motion of a windshield wiper) or any other such mechanism to scan over rotation angles 906 in an efficient manner as may serve a particular implementation.

Similar to the configuration of FIG. 7, the configuration of FIG. 9 illustrates an example of inward-looking, phase-matched depth scanning of surfaces 916 included within a real-world scene contained within a rectangular shape (i.e., real-world scene 912) using a depth scanning system having four depth scanning devices. As used herein, it will be understood that a "rectangular shape" may be a quadrilateral that at least approximates a rectangle (i.e., includes four sides and four corners that are approximately equal). As such, rectangles, squares, and/or other quadrilaterals (e.g., parallelograms, rhombuses, etc.) that have four angles that are all approximately equal (i.e., approximately 90°) may all be referred to herein as "rectangular shapes."

As shown, the depth scanning system of FIG. 9 includes depth scanning device 900-1 configured to be disposed at a first corner of the rectangular shape and configured to detect depth data for surfaces 916 from vantage point 902-1 of the first corner by rotating scan head 904-1 in clockwise motion 908-1 so as to progressively aim scan field 910-1 over 90° to scan, during a scan time period, surfaces 916 included within real-world scene 912 contained within the rectangular shape. The depth scanning system of FIG. 9 further includes depth scanning device 900-2 configured to be disposed at a second corner of the rectangular shape adjacent to (i.e., sharing a side with) the first corner and configured to detect depth data for surfaces 916 from vantage point 902-2 of the second corner by rotating scan head 904-2 in phase with the rotation of scan head 904-1 and in counterclockwise motion 908-2 so as to progressively aim scan field 910-2 over 90° to scan, during the scan time period, surfaces 916 included within real-world scene 912 contained within the rectangular shape.

The depth scanning system illustrated in the example of FIG. 9 further includes depth scanning device 900-3 configured to be disposed at a third corner of the rectangular shape adjacent to (i.e., sharing a side with) the second corner and non-adjacent to (i.e., diagonal from and not sharing a side with) the first corner. Depth scanning device 900-3 may be configured to detect depth data for surfaces 916 from vantage point 902-3 of the third corner by rotating scan head 904-3 in phase with the rotation of scan heads 904-1 and 904-2 in clockwise motion 908-3 so as to progressively aim scan field 910-3 over 90° to scan, during the scan time period, surfaces 916 included within real-world scene 912 contained within the rectangular shape. Additionally, the depth scanning system of FIG. 9 includes depth scanning device 900-4 configured to be disposed at a fourth corner of the rectangular shape adjacent to the first and third corners and non-adjacent to the second corner and configured to detect depth data for surfaces 916 from vantage point 902-4 of the fourth corner by rotating scan head 904-4 in phase with the rotation of the other scan heads 704 and in counterclockwise motion 908-4 so as to progressively aim scan field 910-4 over 90° to scan, during the scan time period, surface 916 included within the real-world scene 912 contained within the rectangular shape.

Figure 10:
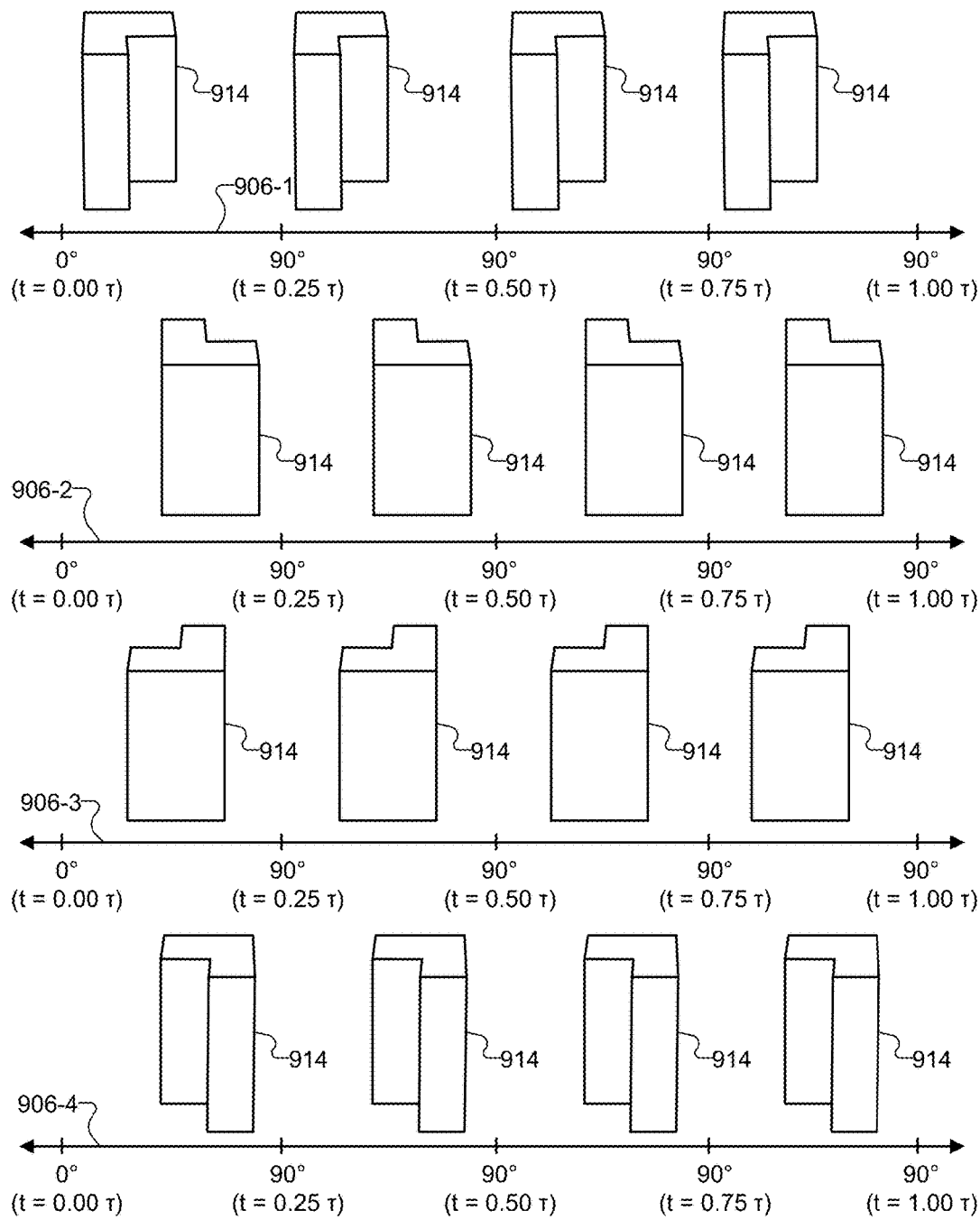
FIG. 10 illustrates exemplary depth scan details for a single scan time period for each of the depth scanning devices illustrated in FIG. 9 according to principles described herein.

FIG. 10 illustrates how the configuration of FIG. 9 improves not only the synchronicity with which the surfaces included within a real-world scene are scanned (i.e., as similarly illustrated by FIG. 8 above), but also how the configuration of FIG. 9 leads to gains in efficiency as compared, for example, with the configurations of FIGS. 5 and 7. Specifically, FIG. 10 illustrates exemplary depth scan details for a single scan time period for each of depth scanning devices 900 in a similar format to the depth scan details illustrated in FIGS. 6 and 8. Whereas the depth scan details illustrated in FIGS. 6 and 8 illustrate timing of when surfaces of objects (i.e., objects 514 and 714, respectively) are scanned with respect to a scan time period of an entire scan cycle (i.e., represented by "τ"), the depth scan details illustrated in FIG. 10 show that, during the same scan time period ("τ") represented in FIGS. 6 and 8, the depth scanning system implementation of FIG. 9 essentially completes four scan cycles over the 90° rotation angles 906 associated with real-world scene 912. Specifically, as shown, each rotation angle 906 (i.e., rotation angles 906-1 through 906-4) is represented four consecutive times in FIG. 10 to show how depth data for surfaces of object 914 may be detected at approximately four times the scan frequency provided by the other depth scanning system implementations. This increased scan frequency may be beneficial in certain implementations, particularly in implementations where object 914 and/or other objects or surfaces included within real-world scene 912 are dynamic (e.g., moving quickly, in constant motion, etc.).

FIGS. 8 and 10 illustrate that the implementations of the depth scanning systems in FIGS. 7 and 9, respectively, are configured to scan surfaces near the center of a real-world scene (i.e., surfaces 716 of object 714 and surfaces 916 of object 914, respectively) with small or negligible scan time discrepancy between when each depth scanning device in the respective depth scanning systems scans the surfaces. However, it will be understood that scan time discrepancies with which different objects within a real-world scene are scanned by configurations such as those in FIGS. 7 and 9 may vary depending on a position of the surfaces within a particular real-world scene. For example, while surfaces near the center of a rectangular real-world scene may be scanned simultaneously or near-simultaneously when depth scanning devices are arranged to rotate as illustrated in FIGS. 7 and 9, surfaces offset from the center may still be scanned at slightly different times (i.e., with non-negligible scan time discrepancy), even though all surfaces may be scanned closer in time to one another than surfaces using a configuration such as that shown in FIG. 5, for example. In certain depth scanning applications (e.g., applications where surfaces are relatively motionless or moving relatively slowly), a scan time discrepancy between when surfaces are scanned by different depth scanning devices may be acceptable. However, for depth scanning applications that include dynamic, fast-moving surfaces, scan time discrepancies at different positions within a real-world scene being depth scanned may be taken into account.

Figures 11A, 11B:
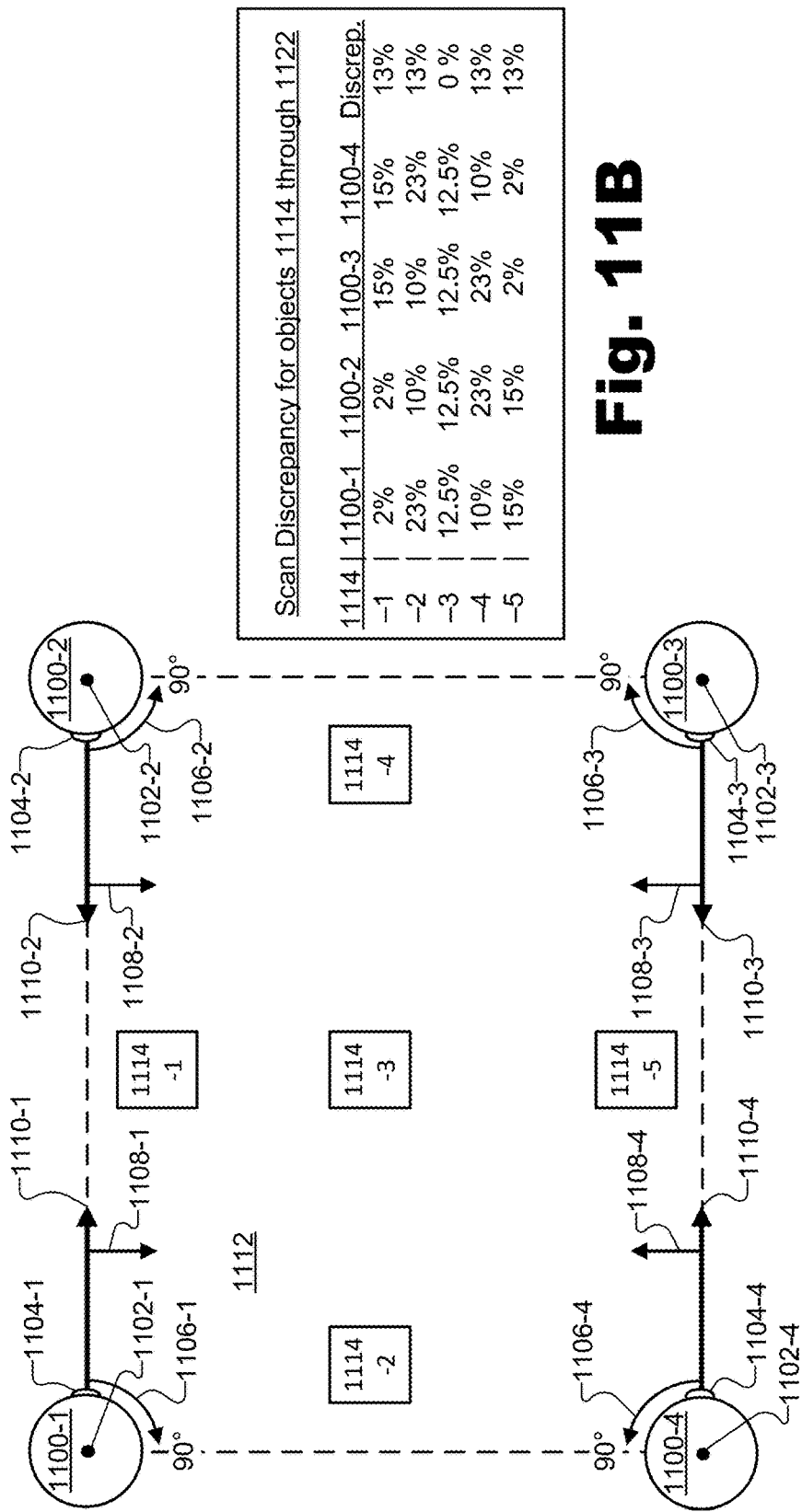
FIG. 11A illustrates a top view of an exemplary configuration in which an exemplary depth scanning system performs inward-looking depth scanning of an exemplary real-world scene including various objects at different positions within the real-world scene according to principles described herein.
FIG. 11B illustrates a scan time discrepancy table including data for the depth scans of each of the objects in FIG. 11A by each of the depth scanning devices included in the depth scanning system of FIG. 11A according to principles described herein.

To illustrate how scan time discrepancies may vary by location, FIG. 11A shows a top view of an exemplary configuration in which an exemplary depth scanning system performs inward-looking depth scanning of an exemplary real-world scene including various objects at different positions within the real-world scene, while FIG. 11B illustrates a scan time discrepancy table including data for the depth scans of each of the objects in FIG. 11A by each of the depth scanning devices included in the depth scanning system of FIG. 11A. Similar to other depth scanning system configurations illustrated herein (e.g., configurations illustrated in FIGS. 5, 7, and 9), the depth scanning system illustrated in FIG. 11 includes a plurality of depth scanning devices 1100 disposed at respective locations associated with respective vantage points 1102 (i.e., vantage points 1102-1 through 1102-4). Additionally, as shown, depth scanning devices 1100 also include respective scan heads 1104 (i.e., scan heads 1104-1 through 1104-4) that rotate around respective rotation angles 1106 (i.e., rotation angles 1106-1 through 1106-4) in respective motions 1108 (i.e., clockwise motions 1108-1 and 1108-3, and counterclockwise motions 1108-2 and 1108-4) so as to progressively aim respective scan fields 1110 (i.e., scan fields 1110-1 through 1110-4) to sweep across surfaces included in a real-world scene 1112.

The operation of depth scanning devices 1100 may be similar to the operation of other depth scanning devices described above in that the inward-looking configuration of depth scanning devices 1100 in FIG. 11 allows surfaces of objects included within real-world scene 1112 to be scanned to detect depth data for the surfaces. In particular, the depth scanning system of FIG. 11 is similar to the depth scanning system of FIG. 9 in that each depth scanning device 1100 is phase matched with the other depth scanning devices in the same manner as described above and each only rotates over 90° of real-world scene 1112 detectable from its respective vantage point 1102. However, whereas other configurations described above illustrate how implementations of depth scanning systems detect depth data for surfaces of a single object near the center of a real-world scene, the configuration of FIG. 11A shows how depth data is detected for surfaces of a plurality of objects 1114 (e.g., objects 1114-1 through 1114-5) disposed at different positions within real-world scene 1112.

Specifically, the scan time discrepancy table of FIG. 11B denotes, as an approximate percentage in relation to an entire 360° scan time period ("τ"), when within the scan time period each object 1114 (i.e., objects 1114 "−1", "−2", "−3", "−4" and "−5") may be scanned by each depth scanning device 1100. For example, as shown, object 1114-1 may be scanned by depth scanning devices 1100-1 and 1100-2 early in the scan time period (i.e., at approximately 2% of the way into the scan time period) while not being scanned by depth scanning devices 1100-3 and 1100-4 until later in the scan time period (i.e., at approximately 15% of the way into the scan time period). It is noted that, because the percentages listed in FIG. 11B are in relation to the entire scan time period, each of the percentages are less than 25%. This is because, as illustrated in FIG. 10, for example, the entirety of real-world scene 1112 may be depth scanned up to four times during the scan time period, meaning that a single scan may be performed in only 25% of the scan time period. As such, while not explicitly shown in FIG. 11B, it will be understood that each depth scanning device 1100 may scan each object 1114 more than once (e.g., four times) during the scan time period. For example, rather than just scanning object 1114-1 at 2% of the way through the scan time period, depth scanning devices 1100-1 and 1100-2 may scan object 1114-1 at approximately 2%, 27%, 52%, and 77% of the way through the scan time period (see FIG. 10).

Each object 1114 in the scan time discrepancy table of FIG. 11B is also associated with a scan time discrepancy listed in the "Discrep." column of the table. As shown, the scan time discrepancies are expressed as the difference between the highest and lowest percentages of the other columns associated with the object. For example, since object 1114-1 is scanned by depth scanning devices 1100-1 and 1100-2 at 2% (i.e., the lowest percentage) and by depth scanning devices 1100-3 and 1100-4 at 15% (i.e., the highest percentage), the scan time discrepancy for object 1114 is listed as 13% (i.e., 15%-2%). Accordingly, this means that approximately 13% of the total scan time period may elapse between when a first depth scanning device 1100 scans a surface disposed at the position of object 1114-1 and when a last depth scanning device 1100 scans the surface during the same phase matched scan cycle. In an example where the total scan time period is 50 ms, for example, this discrepancy may amount to approximately 6.5 ms. As shown, due to symmetry of the placement of objects 1114-1, 1114-2, 1114-4, and 1114-5, each of these objects may be scanned with a scan time discrepancy of approximately 13%. However, object 1114-3, at a position in the middle of real-world scene 1112, may be scanned with a negligible scan time discrepancy (i.e., a scan time discrepancy of approximately 0%).

The examples described above have illustrated various implementations of inward-looking depth scanning systems that include at least first and second depth scanning devices that scan a real-world scene horizontally during a scan time period. In other words, as shown in various examples above, depth scanning devices in the depth scanning systems illustrated up to this point have used respective axes of rotation associated with each scan head of the depth scanning devices that are vertical axes with respect to the real-world scene to allow for the horizontal depth scanning. As further described above, various features may be included within various implementations of horizontally-scanning depth scanning systems so as to increase scan time efficiency of the depth scanning system (e.g., to reduce scan time expended scanning surfaces not associated with the real-world scene) and/or to decrease scan time discrepancies with which different surfaces within a real-world scene are scanned by different depth scanning devices. In certain implementations, however, it may be desirable to capture surfaces included in a real-world scene with even smaller scan time discrepancies and/or with a constant scan time discrepancy regardless of where the surfaces are disposed within the real-world scene.

To this end, in some examples, a vertically-scanning depth scanning system may be employed. Like other depth scanning systems described herein, a vertically-scanning depth scanning system may include a plurality of depth scanning devices including at least a first and a second depth scanning device each having a respective rotating scan head and other components shown and described in connection with other depth scanning devices disclosed herein. In contrast to horizontally-scanning depth scanning systems described above, however, in a vertically-scanning depth scanning system, a first axis of rotation associated with the first scan head of the first depth scanning device and a second axis of rotation associated with the second scan head of the second depth scanning device may both be horizontal axes with respect to the real-world scene such that the first and second depth scanning devices scan the real-world scene vertically during the scan time period.

Figure 12:
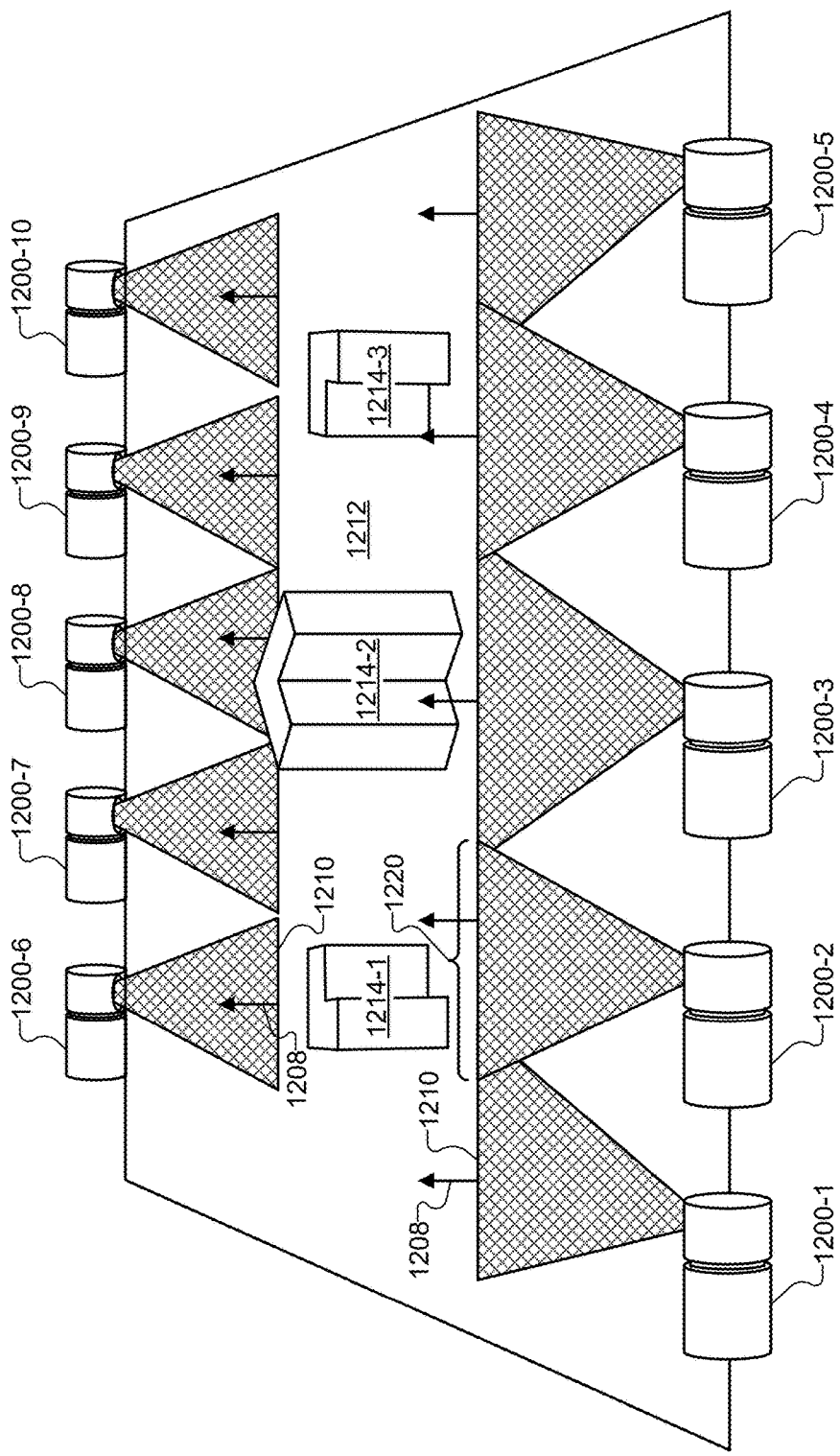
FIG. 12 illustrates a perspective view of an exemplary configuration in which an exemplary vertically-scanning depth scanning system including a plurality of depth scanning device performs inward-looking depth scanning of an exemplary real-world scene to detect depth data for surfaces included in the real-world scene according to principles described herein.

To illustrate, FIG. 12 shows a perspective view of an exemplary configuration in which an exemplary vertically-scanning depth scanning system including a plurality of depth scanning devices performs inward-looking depth scanning of an exemplary real-world scene to detect depth data for surfaces included in the real-world scene. As shown, the depth scanning system of FIG. 12 includes a plurality of depth scanning devices 1200 (e.g., depth scanning devices 1200-1 through 1200-10) that will be understood to each include the same components and aspects as other depth scanning devices described herein, even though each of the components and aspects is not explicitly labeled for each and every depth scanning device 1200 in FIG. 12. For example, as labeled explicitly in relation to depth scanning device 1200-1, each depth scanning device 1200 on one side of a real-world scene 1212 (i.e., depth scanning devices 1200-1 through 1200-5) may be configured to rotate respective scan fields 1210 in a clockwise motion 1208 from a perspective of a common reference point located "above"

the scan heads of the depth scanning devices (i.e., a common reference point on the right-hand side of FIG. 12). Meanwhile, each depth scanning device 1200 on an opposite side of real-world scene 1212 (i.e., depth scanning devices 1200-6 through 1200-10) may be configured to rotate respective scan fields 1210 in a counterclockwise motion 1208 from the perspective of the same common reference point.

These rotations may be phase matched with one another as described above. For example, a scan field 1210 of depth scanning device 1200-1 may aim at a vantage point of depth scanning device 1200-6 across real-world scene 1212 at a same moment that a scan field 1210 of depth scanning device 1200-6 aims at a vantage point of depth scanning device 1200-1. Other pairs of depth scanning devices 1200 across from one another (e.g., depth scanning devices 1200-2 and 1200-7, 1200-3 and 1200-8, etc.) may be phase matched in a similar way. Alternatively, each depth scanning device 1200 may be phase matched with every other depth scanning device 1200, but may not be paired with another depth scanning device in this way. Regardless, as shown, each of depth scanning devices 1200 may, for example, begin scanning along the ground of real-world scene 1212 at a same moment during each scan time period so as to capture every surface along the horizontal plane of the ground simultaneously or with a negligible scan time discrepancy. This is possible because each depth scanning device 1200 has a horizontal extent 1220 (i.e., analogous to vertical extent 420 described above in relation to FIG. 4), as labeled specifically in relation to depth scanning device 1200-2.

In the configuration of FIG. 12, each depth scanning device 1200 may have a rotation angle even smaller than the 90° rotation angles described above. For example, if objects 1214 within real-world scene 1212 (i.e., objects 1214-1 through 1214-3) are not particularly tall or high off the ground, each depth scanning device 1200 may have a rotation angle of only, for example, 15° or 20°. As a result, an even larger number of depth scans (e.g., greater than the four depth scans described and illustrated above in relation to FIG. 10) may be performed by each depth scanning device 1200 during the course of a single 360° scan time period. This may result in an increase in the depth data that the depth scanning system is able to detect, which may be beneficial in certain implementations. Additionally, as mentioned above, each of objects 1214 may be scanned simultaneously by the depth scanning system of FIG. 12 regardless of where the objects are positioned within real-world scene 1212, which may also be beneficial in the same or other implementations.

While drawings and examples provided herein have focused either on implementations where scan heads of depth scanning devices rotate on vertical axes with respect to the real-world scene (i.e., to scan the real-world scene horizontally) or on implementations where scan heads of depth scanning devices rotate on horizontal axes with respect to the real-world scene (i.e., to scan the real-world scene vertically), it will be understood that, in certain examples, implementations that leverage both vertical and horizontal scanning may also be implemented to provide benefits described herein for both horizontal and vertical scanning.

Figure 13:
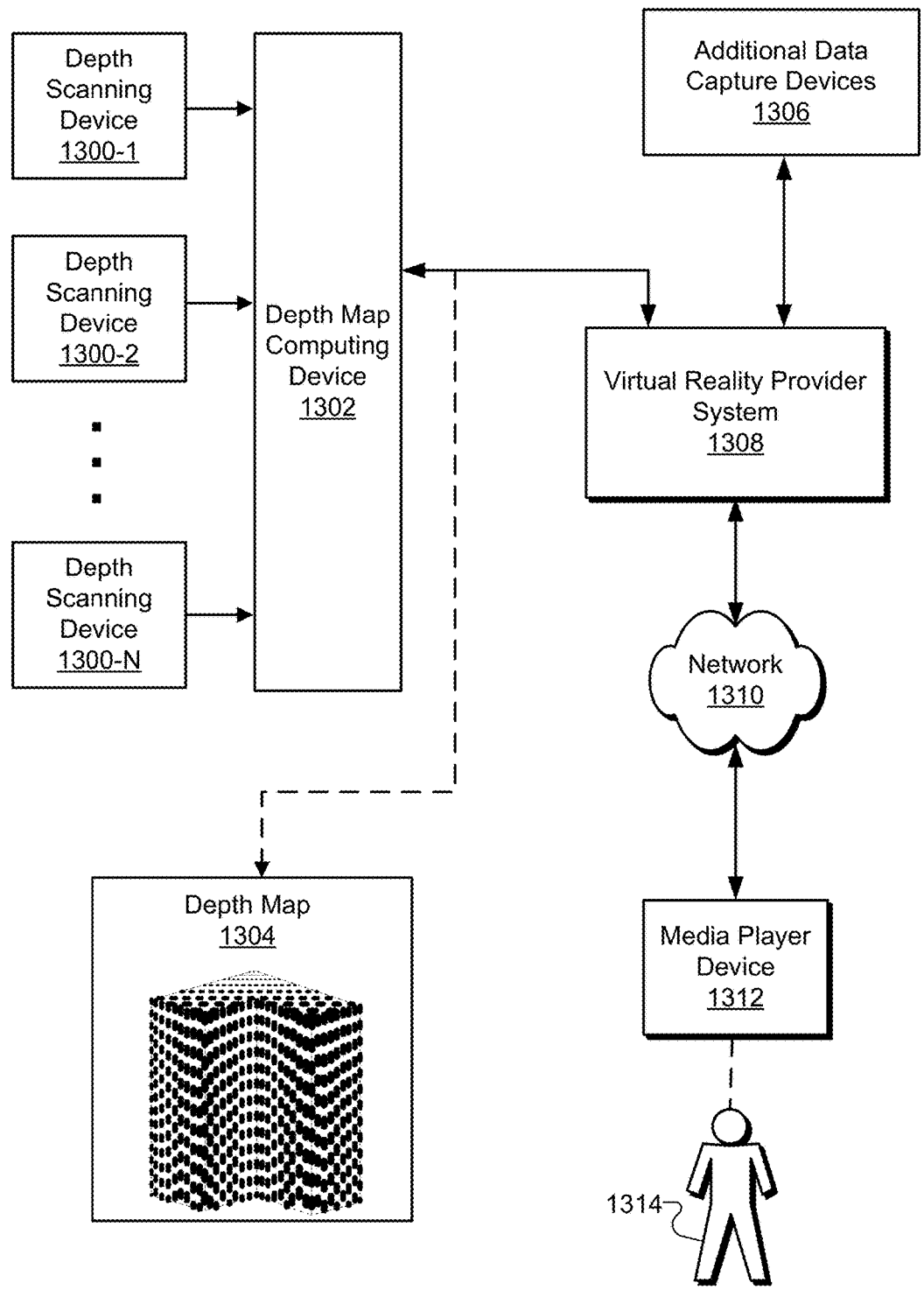
FIG. 13 illustrates an exemplary configuration in which an exemplary depth scanning system is used to provide virtual reality media content to a media player device associated with a user according to principles described herein.

To illustrate how depth data detected by the depth scanning system implementations described herein may be used, FIG. 13 shows an exemplary configuration in which an exemplary depth scanning system is used to provide virtual reality media content to a media player device associated with a user. Specifically, as shown in FIG. 13, a plurality of depth scanning devices 1300 (e.g., depth scanning devices 1300-1 through 1300-N) may be communicatively coupled with a depth map computing device 1302, which may generate a depth map 1304 that is provided, along with data generated by additional data capture devices 1306, to a virtual reality provider system 1308. Virtual reality provider system 1308 may generate virtual reality media content based on the received depth map and provide, by way of a network 1310, the virtual reality media content to a media player device 1312 associated with a user 1314.

While a depth scanning system such as system 100 is not explicitly labeled in FIG. 13, it will be understood that the components shown may constitute an implementation of a depth scanning system. For example, in some implementations, the depth scanning system may include depth scanning devices 1300 only, or depth scanning devices 1300 and depth map computing device 1302. The depth scanning system may be communicatively coupled with virtual reality provider system 1308 along with additional data capture device 1306 (e.g., which may detect or capture types of data other than depth data). In other implementations, the depth scanning system may include not only depth scanning devices 1300 and depth map computing device 1302, but also part or all of virtual reality provider system 1308 and/or one or more additional data capture devices 1306. Each of the elements illustrated in FIG. 13 will now be described in more detail.

Depth scanning devices 1300 may be implemented by any of the depth scanning devices described herein and may operate in similar or identical ways as other disclosed depth scanning devices and in similar or identical configurations as those described above. For example, each depth scanning device 1300 may be implemented as a LIDAR device configured to detect depth data based on a time of flight of a laser pulse emitted by the LIDAR device and that reflects from surfaces included within a real-world scene to be detected by the LIDAR device from a particular vantage point. Additionally, as described above, each depth scanning device 1300 may be synchronized with one another using a synchronization signal such as a series of pulses generated by a master clock included in the depth scanning system (not explicitly shown). Moreover, each depth scanning device 1300 may maintain a running time such that depth data detected by depth scanning devices 1300 may be marked or labeled with a timecode representative of the time at which the depth data was detected. In other words, metadata representative of a timecode at which depth data is detected may be added to or included with the depth data by depth scanning devices 1300.

Depth map computing device 1302 may be implemented by a computer server or by any other type of computing device described herein and, as such, may include any hardware and/or software components for performing any of the operations described herein as may serve a particular implementation. In particular, depth map computing device 1302 may be configured to perform operations such as receiving (e.g., from depth scanning devices 1300) detected depth data for surfaces included within a real-world scene from respective vantage points of depth scanning devices 1300, and generating depth map 1304 of the surfaces based on the received detected depth data for the surfaces. For example, using timecodes and/or other metadata included with the depth data (e.g., timecodes and/or other metadata with which the depth data is marked by depth scanning devices 1300, as described above), depth map computing device 1302 may correlate depth data from various depth scanning devices 1300 into a single, multiple perspective depth map such as depth map 1304. In some examples, after generating depth map 1304, depth map computing device 1302 may further be configured to perform operations such as providing depth map 1304 to virtual reality provider system 1308 for use by virtual reality provider system 1308 in generating and providing virtual reality media content to media player device 1312 associated with user 1314.

Depth map 1304 may be generated by depth map computing device 1302 and may represent depth data from one or more perspectives (e.g., one or more of the vantage points associated with depth scanning devices 1300) around the real-world scene. For example, as mentioned above, by including depth data detected by multiple depth scanning devices 1300, depth map 1304 may be a multiple perspective depth map representing more surfaces of objects included in the real-world scene than may be detectable from any single vantage point. In some examples, depth map 1304 may include a 4D representation of the surfaces with respect to a 3D global coordinate system (i.e., a global coordinate system in 3D space) and with respect to a temporal dimension. In other words, depth map 1304 may include data allowing a volumetric representation of objects and surfaces included within the real-world scene to be recreated throughout a period of time. In other examples, depth map 1304 may be represented by a plurality of images (e.g., grayscale images) representative of depth data from each of the vantage points of depth scanning devices 1300. For example, each image may be associated with a timecode allowing multiple images detected at the same time to be correlated with one another, and may include a grayscale value for each pixel in the image that represents the depth of a surface represented by the pixel (e.g., where values closer to white are further from the vantage point and values closer to black are closer to the vantage point, or vice versa).

Depth data 1304 may depict surfaces included within the real-world scene in any suitable manner and/or using any suitable format. As one example, depth data 1304 may represent the depth (i.e., the distance or position) of each point on the surfaces of an object relative to a particular vantage point using a grayscale image format. For instance, as depicted in FIG. 13, rather than representing how light reflects from the surfaces of the object as may be represented in a color model, a grayscale image of depth map 1304 may represent, for each pixel in the image, how far away the point represented by that pixel is from a particular reference point (e.g., the particular vantage point, a global reference point for a global 3D coordinate system, etc.). For example, points that are closer to depth capture device 506 may be represented with values that represent darker shades of gray, while points that are farther away from depth capture device 506 may be represented with values that represent lighter shades of gray.

Additional data capture devices 1306 may represent any suitable systems or devices that may further capture data used by virtual reality provider system 1308 to generate the virtual reality media content. For example, while depth scanning systems described herein focus on detecting depth data for surfaces within a real-world scene, additional data capture devices 1306 integrated with depth scanning systems and/or otherwise interoperating with depth scanning systems may similarly detect texture data for the same surfaces for which depth data 1304 is captured (e.g., two-dimensional color video data), audio data, metadata, and/or other types of data that may be used to realistically represent a real-world scene within a virtual reality world associated with virtual reality media content. For example, texture capture devices may complement depth scanning devices (e.g., by being aligned, synchronized, and/or disposed in corresponding locations with the depth scanning devices) such that a depth and texture map or image of surfaces included within the real-world scene may be generated to represent both texture (e.g., color) and depth (e.g., position) for each pixel in the depth and texture map or image.

To this end, virtual reality provider system 1308 may be associated with a virtual reality provider entity and may include any hardware and/or software (e.g., one or more server computers, etc.) configured to process depth data received from depth map computing device 1302 and/or from depth scanning devices 1300 (e.g., depth map 1304) as well as other types of data received from other sources (e.g., from additional data capture devices 1306) to generate virtual reality media content that may be provided to client-side media player devices to be experienced by users. As will be described in more detail below, the virtual reality media content generated and provided by virtual reality provider system 1308 may be configured to be experienced by users (e.g., user 1314) by way of media player devices (e.g., media player device 1312) and to be experienced from dynamically selectable virtual viewpoints selected by the users within virtual reality worlds associated with the virtual reality media content.

Network 1310 may include a provider-specific wired or wireless network (e.g., a cable or satellite carrier network or a mobile telephone network), the Internet, a wide area network, a content delivery network, or any other suitable network. Data may flow between virtual reality provider system 1308 and one or more media player devices such as media player device 1312 using any communication technologies, devices, media, and protocols as may serve a particular implementation.

Media player device 1312 may be used by user 1314 to access and experience virtual reality media content provided by virtual reality provider system 1308. For example, media player device 1312 may be configured to generate a virtual reality world representative of a real-world scene being scanned by depth scanning devices 1300 to be experienced by user 1314 from an arbitrary virtual viewpoint (e.g., a dynamically selectable virtual viewpoint selected by the user and corresponding to an arbitrary virtual location within the virtual reality world representative of the real-world scene). To this end, media player device 1312 may include or be implemented by any device capable of presenting a field of view of a virtual reality world and detecting user input from user 1314 to dynamically update the part of the virtual reality world presented within the field of view as user 1314 experiences the virtual reality world.

Figure 14:
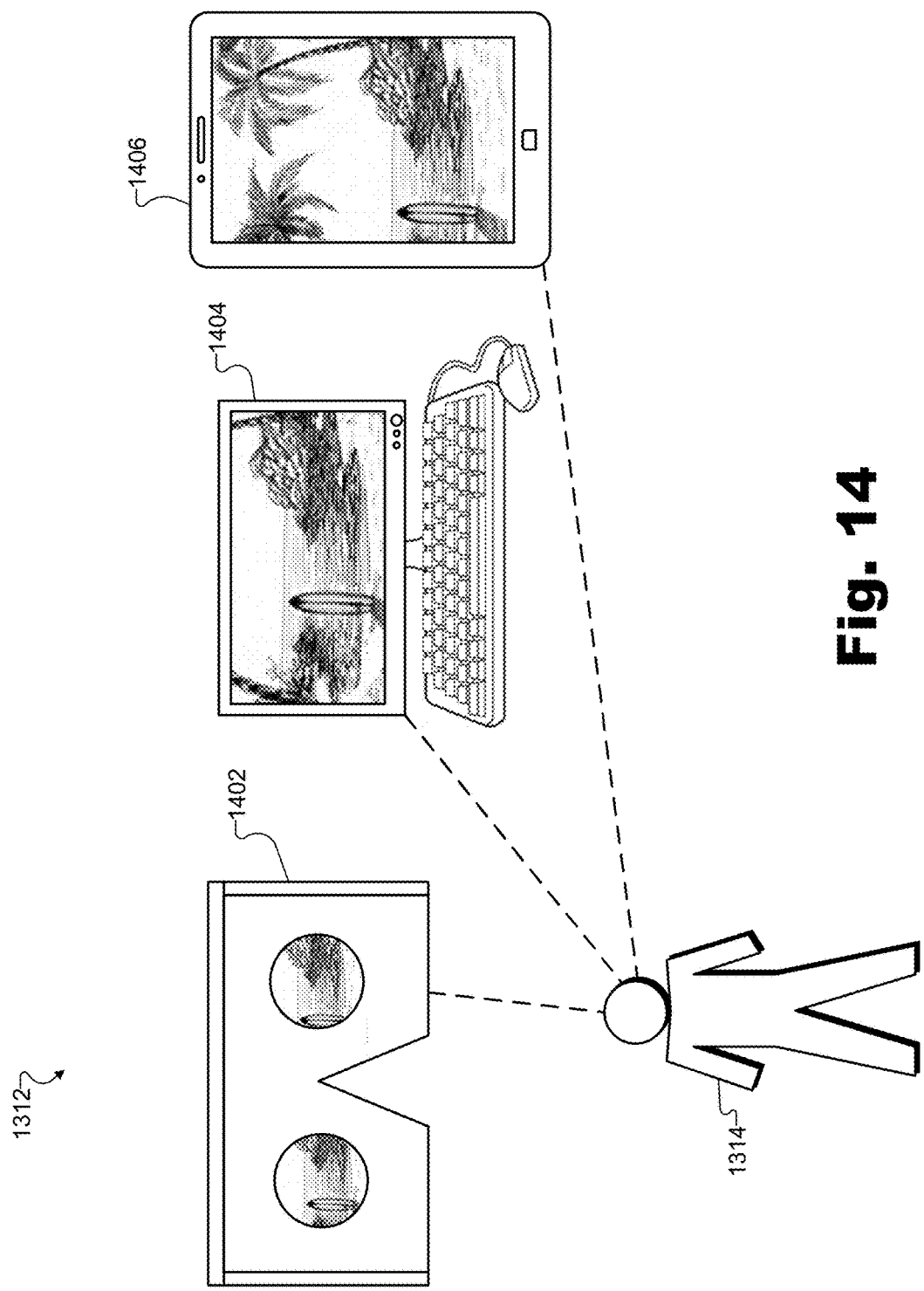
FIG. 14 illustrates exemplary types of media player devices that may be included within the configuration of FIG. 13 for use by a user in experiencing virtual reality media content according to principles described herein.

FIG. 14 illustrates exemplary types of media player devices that may be included within the configuration of FIG. 13 (i.e., to implement media player device 1312 or another media player device to which the virtual reality media content is provided) for use by user 1314 in experiencing the virtual reality media content. Specifically, as shown, media player device 1312 may take one of several different form factors such as a head-mounted virtual reality device 1402 (e.g., a virtual reality gaming device) that includes a head-mounted display screen, a personal computer device 1404 (e.g., a desktop computer, laptop computer, etc.), a mobile or wireless device 1406 (e.g., a smartphone, a tablet device, etc., possibly mounted to the head of user 1314 by means of a head mount apparatus), or by any other device or configuration of devices that may serve a particular implementation to facilitate receiving and/or presenting virtual reality media content. Different types of media player devices (e.g., head-mounted virtual reality devices, personal computer devices, mobile devices, etc.) may provide different types of virtual reality experiences having different levels of immersiveness for user 1314.

Figure 15:
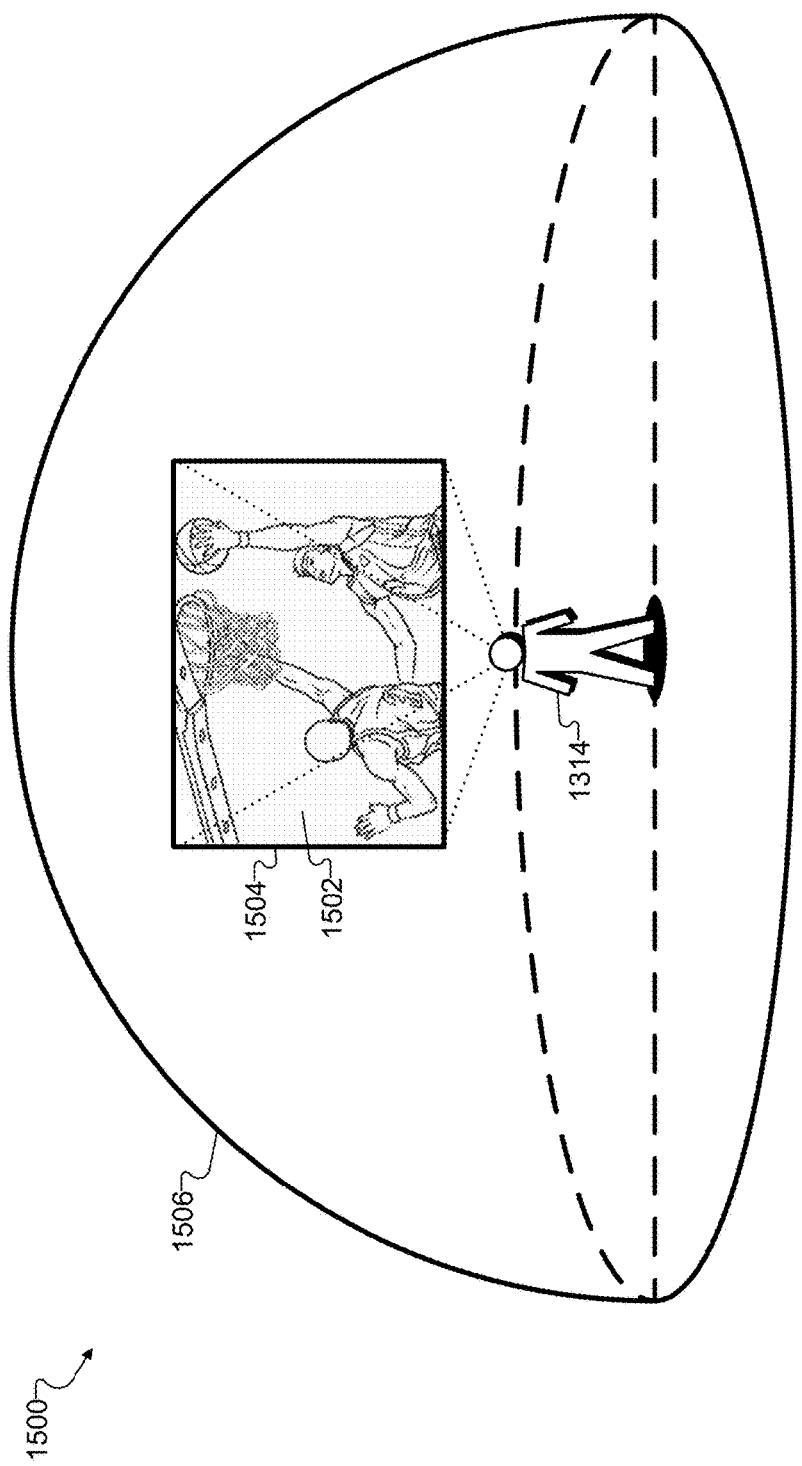
FIG. 15 illustrates an exemplary virtual reality experience in which a user is presented with exemplary virtual reality media content associated with a virtual reality world as experienced from a dynamically selectable virtual viewpoint within the virtual reality world according to principles described herein.

FIG. 15 illustrates an exemplary virtual reality experience 1500 in which user 1314 is presented with exemplary virtual reality media content (e.g., virtual reality media content generated and provided by virtual reality provider system 1308) associated with a virtual reality world as experienced from a dynamically selectable virtual viewpoint within the virtual reality world. Specifically, as shown, virtual reality media content 1502 may be presented within a field of view 1504 that shows a virtual reality world 1506 from a virtual viewpoint corresponding to an arbitrary virtual location right underneath a basketball standard within the representation of virtual reality world 1506 where a shot is being made. User 1314 experiences virtual reality world 1506 by providing user input (e.g., head movements, keyboard input, etc.) to look around and/or to move around (i.e., dynamically select a virtual viewpoint from which to experience) virtual reality world 1506.

For example, field of view 1504 may provide a window through which user 1314 may easily and naturally look around a virtual representation of a real-world scene for which depth data and/or other types of data have been detected. Field of view 1504 may be presented by media player device 1312 (e.g., on a display screen of media player device 1312) and may include video depicting objects surrounding user 1314 within virtual reality world 1506. Additionally, field of view 1504 may dynamically change in response to user input provided by user 1314 as user 1314 experiences virtual reality world 1506. For example, media player device 1312 may detect user input (e.g., moving or turning the display screen upon which field of view 1504 is presented). In response, field of view 1504 may display different objects and/or objects seen from a different virtual viewpoint or virtual location in place of the objects seen from the previous virtual viewpoint or virtual location.

In FIG. 15, virtual reality world 1506 is illustrated as a semi-sphere, indicating that user 1314 may look in any direction within virtual reality world 1506 that is substantially forward, backward, left, right, and/or up from the virtual viewpoint of the location under the basketball standard that user 1314 has currently selected. In other examples, virtual reality world 1506 may include an entire 360° by 180° sphere such that user 1314 may also look down. Additionally, user 1314 may move around to other locations within virtual reality world 1506 (i.e., dynamically selecting different dynamically selectable virtual viewpoints). For example, user 1314 may select a virtual viewpoint at half court, a virtual viewpoint from the free-throw line facing the basketball standard, a virtual viewpoint suspended above the basketball standard, or the like.

Figure 16:
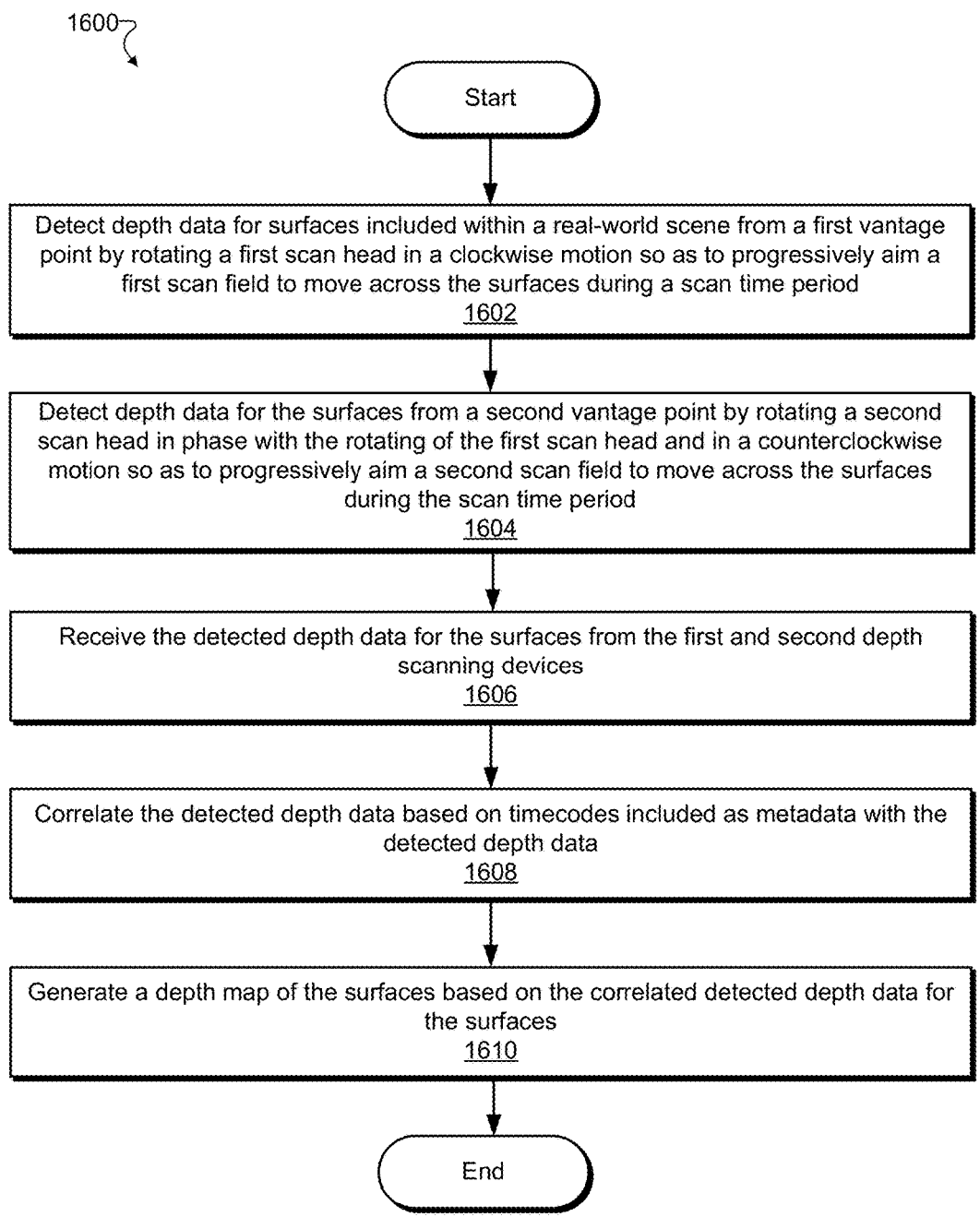
FIG. 16 illustrates an exemplary method for inward-looking, phase-matched depth scanning of a real-world scene according to principles described herein.

FIG. 16 illustrates an exemplary method 1600 for inward-looking, phase-matched depth scanning of a real-world scene. While FIG. 16 illustrates exemplary operations according to one embodiment, other embodiments may omit, add to, reorder, and/or modify any of the operations shown in FIG. 16. One or more of the operations shown in FIG. 16 may be performed by system 100, any components (e.g., depth scanning devices, etc.) included therein, and/or any implementation thereof.

In operation 1602, a first depth scanning device included in a depth scanning system and disposed at a first location with respect to a real-world scene may detect depth data for surfaces included within the real-world scene. For example, the first depth scanning device may detect the depth data from a first vantage point of the first location by rotating a first scan head in a clockwise motion so as to progressively aim a first scan field to sweep across the surfaces during a scan time period.

In operation 1604, a second depth scanning device included in the depth scanning system and disposed at a second location with respect to the real-world scene may detect depth data for the surfaces included within the real-world scene. For example, the second depth scanning device may detect the depth data from a second vantage point of the second location by rotating a second scan head in phase with the rotating of the first scan head performed by the first depth scanning device in operation 1602. The second depth scanning device may rotate the second scan head in a counter-clockwise motion so as to progressively aim a second scan field to sweep across the surfaces during the scan time period.

Operations 1602 and 1604 may be performed in any of the ways described herein. For instance, the in-phase rotations of the first and second scan heads may be performed in such a way that the first scan field aims at the second vantage point at a same moment during the scan time period when the second scan field aims at the first vantage point.

In operation 1606, a computing device included in the depth scanning system may receive the depth data detected by the first and second depth scanning devices in operations 1602 and 1604 from the first and second depth scanning devices. The detected depth data may be depth data for the surfaces included within the real-world scene from the first and second vantage points. Operation 1606 may be performed in any of the ways described herein.

In operation 1608, the computing device included in the depth scanning system may correlate the detected depth data received in operation 1606 based on timecodes included as metadata with the detected depth data. Operation 1608 may be performed in any of the ways described herein.

In operation 1610, the computing device included in the depth scanning system may generate a depth map of the surfaces included within the real-world scene. For example, the computing device may generate the depth map of the surfaces based on the detected depth data for the surfaces that is correlated in operation 1608. Operation 1610 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 17:
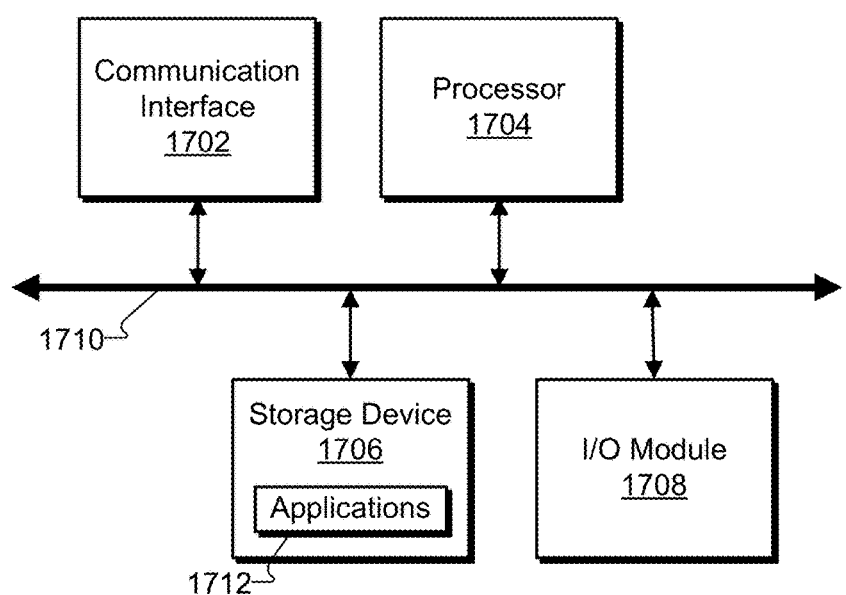
FIG. 17 illustrates an exemplary computing device according to principles described herein.

FIG. 17 illustrates an exemplary computing device 1700 that may be specifically configured to perform one or more of the processes described herein. As shown in FIG. 17, computing device 1700 may include a communication interface 1702, a processor 1704, a storage device 1706, and an input/output ("I/O") module 1708 communicatively connected via a communication infrastructure 1710. While an exemplary computing device 1700 is shown in FIG. 17, the components illustrated in FIG. 17 are not intended to be limiting. Additional or alternative components may be used in other embodiments. Components of computing device 1700 shown in FIG. 17 will now be described in additional detail.

Communication interface 1702 may be configured to communicate with one or more computing devices. Examples of communication interface 1702 include, without limitation, a wired network interface (such as a network interface card), a wireless network interface (such as a wireless network interface card), a modem, an audio/video connection, and any other suitable interface.

Processor 1704 generally represents any type or form of processing unit capable of processing data or interpreting, executing, and/or directing execution of one or more of the instructions, processes, and/or operations described herein. Processor 1704 may direct execution of operations in accordance with one or more applications 1712 or other computer-executable instructions such as may be stored in storage device 1706 or another computer-readable medium.

Storage device 1706 may include one or more data storage media, devices, or configurations and may employ any type, form, and combination of data storage media and/or device. For example, storage device 1706 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1706. For example, data representative of one or more executable applications 1712 configured to direct processor 1704 to perform any of the operations described herein may be stored within storage device 1706. In some examples, data may be arranged in one or more databases residing within storage device 1706.

I/O module 1708 may include one or more I/O modules configured to receive user input and provide user output. One or more I/O modules may be used to receive input for a single virtual reality experience. I/O module 1708 may include any hardware, firmware, software, or combination thereof supportive of input and output capabilities. For example, I/O module 1708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1700. For example, one or more applications 1712 residing within storage device 1706 may be configured to direct processor 1704 to perform one or more processes or functions associated with facilities 102 or 104 of system 100. Likewise, storage facility 106 of system 100 may be implemented by or within storage device 1706.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A depth scanning system comprising:
    a first depth scanning device configured to be disposed at a first corner of a quadrilateral containing a real-world scene and configured to detect depth data for surfaces included within the real-world scene from a first vantage point of the first corner by rotating a first scan head in a first rotational direction so as to progressively aim a first scan field to sweep across the surfaces during a scan time period;
    a second depth scanning device configured to be disposed at a second corner of the quadrilateral adjacent to the first corner and configured to detect depth data for the surfaces from a second vantage point of the second corner by rotating a second scan head in phase with the rotation of the first scan head and in a second rotational direction opposite to the first rotational direction so as to progressively aim a second scan field to sweep across the surfaces during the scan time period;

a third depth scanning device configured to be disposed at a third corner of the quadrilateral adjacent to the second corner and non-adjacent to the first corner and configured to detect depth data for the surfaces from a third vantage point of the third corner by rotating a third scan head in phase with the rotation of the first scan head and in the first rotational direction so as to progressively aim a third scan field to sweep across the surfaces during the scan time period; and a fourth depth scanning device configured to be disposed at a fourth corner of the quadrilateral adjacent to the third corner and non-adjacent to the second corner and configured to detect depth data for the surfaces from a fourth vantage point of the fourth corner by rotating a fourth scan head in phase with the rotation of the first scan head and in the second rotational direction so as to progressively aim a fourth scan field to sweep across the surfaces during the scan time period.

2. The depth scanning system of claim 1, further comprising a computing device configured to:

receive, from the first, second, third, and fourth depth scanning devices, the detected depth data for the surfaces from the first, second, third, and fourth vantage points;

correlate the detected depth data based on timecodes included as metadata with the detected depth data; and generate, based on the correlated detected depth data for the surfaces, a depth map of the surfaces.

3. The depth scanning system of claim 2, wherein the depth map of the surfaces includes a representation of the surfaces with respect to a three-dimensional global coordinate system and with respect to a temporal dimension.

4. The depth scanning system of claim 2, wherein the computing device is further configured to provide, to a virtual reality provider system, the generated depth map of the surfaces for use by the virtual reality provider system in generating and providing virtual reality media content to a media player device associated with a user, the virtual reality media content configured to be experienced by the user by way of the media player device and from a dynamically selectable virtual viewpoint selected by the user within a virtual reality world associated with the virtual reality media content.

5. The depth scanning system of claim 1, wherein the first second, third, and fourth depth scanning devices are implemented by Light Detection and Ranging ("LIDAR") devices.

6. The depth scanning system of claim 1, wherein:

the in-phase rotations of the first and second scan heads are configured such that the first scan field aims at the second vantage point at a same moment during the scan time period when the second scan field aims at the first vantage point;

the in-phase rotations of the third and fourth scan heads are configured such that the third scan field aims at the fourth vantage point at a same moment during the scan time period when the fourth scan field aims at the third vantage point;

the in-phase rotations of the first and fourth scan heads are configured such that the first scan field aims at the fourth vantage point at a same moment during the scan time period when the fourth scan field aims at the first vantage point; and the in-phase rotations of the second and third scan heads are configured such that the second scan field aims at the third vantage point at a same moment during the scan time period when the third scan field aims at the second vantage point.

7. The depth scanning system of claim 1, wherein a first axis of rotation associated with the first scan head a second axis of rotation associated with the second scan head, a third axis of rotation associated with the third scan head, and a fourth axis of rotation associated with the fourth scan head are all vertical axes with respect to the real-world scene such that the first, second, third, and fourth depth scanning devices scan the real-world scene horizontally during the scan time period.

8. The depth scanning system of claim 1, wherein a first axis of rotation associated with the first scan head a second axis of rotation associated with the second scan head, a third axis of rotation associated with the third scan head, and a fourth axis of rotation associated with the fourth scan head are all horizontal axes with respect to the real-world scene such that the first, second, third, and fourth depth scanning devices scan the real-world scene vertically during the scan time period.

9. The depth scanning system of claim 1, wherein:

the first depth scanning device rotates the first scan head in the first rotational direction to sweep, during the scan time period, only across surfaces that are included within a first rotation angle;

the second depth scanning device rotates the second scan head in the second rotational direction to sweep, during the scan time period, only across surfaces that are included within a second rotation angle;

the third depth scanning device rotates the third scan head in the first rotational direction to sweep, during the scan time period, only across surfaces that are included within a third rotation angle;

the fourth depth scanning device rotates the fourth scan head in the second rotational direction to sweep, during the scan time period, only across surfaces that are included within a fourth rotation angle; and the first, second, third, and fourth rotation angles are each less than 360 degrees.

10. A depth scanning system for scanning depth data for surfaces included within a real-world scene contained within a rectangular shape, the system comprising:

a first depth scanning device configured to be disposed at a first corner of the rectangular shape and configured to detect depth data for the surfaces from a first vantage point of the first corner by rotating a first scan head in a first rotational direction so as to progressively aim a first scan field over 90 degrees to scan, during a scan time period, the surfaces included within the real-world scene contained within the rectangular shape;

a second depth scanning device configured to be disposed at a second corner of the rectangular shape adjacent to the first corner and configured to detect depth data for the surfaces from a second vantage point of the second corner by rotating a second scan head in phase with the rotation of the first scan head and in a second rotational direction opposite to the first rotational direction so as to progressively aim a second scan field over 90 degrees to scan, during the scan time period, the surfaces included within the real-world scene contained within the rectangular shape;

a third depth scanning device configured to be disposed at a third corner of the rectangular shape adjacent to the second corner and non-adjacent to the first corner and configured to detect depth data for the surfaces from a third vantage point of the third corner by rotating a third scan head in phase with the rotation of the first and second scan heads and in the first rotational direction so as to progressively aim a third scan field over 90 degrees to scan, during the scan time period, the surfaces included within the real-world scene contained within the rectangular shape; and a fourth depth scanning device configured to be disposed at a fourth corner of the rectangular shape adjacent to the first and third corners and non-adjacent to the second corner and configured to detect depth data for the surfaces from a fourth vantage point of the fourth corner by rotating a fourth scan head in phase with the rotation of the first, second, and third scan heads and in the second rotational direction so as to progressively aim a fourth scan field over 90 degrees to scan, during the scan time period, the surfaces included within the real-world scene contained within the rectangular shape.

11. The depth scanning system of claim 10, further comprising a computing device configured to:

receive, from the first, second, third, and fourth depth scanning devices, the detected depth data for the surfaces from the first, second, third, and fourth vantage points; and generate, based on the received detected depth data for the surfaces, a depth map of the surfaces that includes a four-dimensional representation of the surfaces with respect to a three-dimensional global coordinate system and with respect to a temporal dimension.

12. A method comprising:

detecting, by a first depth scanning device included in a depth scanning system and disposed at a first corner of a quadrilateral containing a real-world scene, depth data for surfaces included within the real-world scene from a first vantage point of the first corner by rotating a first scan head in a first rotational direction so as to progressively aim a first scan field to sweep across the surfaces during a scan time period;

detecting, by a second depth scanning device included in the depth scanning system and disposed at a second corner of the quadrilateral adjacent to the first corner, depth data for the surfaces from a second vantage point of the second corner by rotating a second scan head in phase with the rotating of the first scan head and in a second rotational direction opposite to the first rotational direction so as to progressively aim a second scan field to sweep across the surfaces during the scan time period;

detecting, by a third depth scanning device included in the depth scanning system and disposed at a third corner of the quadrilateral adjacent to the second corner and non-adjacent to the first corner, depth data for the surfaces from a third vantage point of the third corner by rotating a third scan head in phase with the rotating of the first scan head and in the first rotational direction so as to progressively aim a third scan field to sweep across the surfaces during the scan time period;

detecting, by a fourth depth scanning device included in the depth scanning system and disposed at a fourth corner of the quadrilateral adjacent to the third corner and non-adjacent to the second corner, depth data for the surfaces from a fourth vantage point of the fourth corner by rotating a fourth scan head in phase with the rotating of the first scan head and in the second rotational direction so as to progressively aim a fourth scan field to sweep across the surfaces during the scan time period;

receiving, by a computing device included in the depth scanning system from the first and second depth scanning devices, the detected depth data for the surfaces from the first and second vantage points;

correlating, by the computing device, the detected depth data based on timecodes included as metadata with the detected depth data; and generating, by the computing device based on the correlated detected depth data for the surfaces, a depth map of the surfaces.

13. The method of claim 12, wherein the depth map of the surfaces includes a representation of the surfaces with respect to a three-dimensional global coordinate system and with respect to a temporal dimension.

14. The method of claim 12, further comprising:

providing, by the computing device to a virtual reality provider system, the generated depth map of the surfaces for use by the virtual reality provider system in generating and providing virtual reality media content to a media player device associated with a user, the virtual reality media content configured to be experienced by the user by way of the media player device and from a dynamically selectable virtual viewpoint selected by the user within a virtual reality world associated with the virtual reality media content.

15. The method of claim 12, wherein the first, second, third, and fourth depth scanning devices are implemented by Light Detection and Ranging ("LIDAR") devices.

16. The method of claim 12, wherein:

the in-phase rotations of the first and second scan heads are configured such that the first scan field aims at the second vantage point at a same moment during the scan time period when the second scan field aims at the first vantage point;

the in-phase rotations of the third and fourth scan heads are configured such that the third scan field aims at the fourth vantage point at a same moment during the scan time period when the fourth scan field aims at the third vantage point;

the in-phase rotations of the first and fourth scan heads are configured such that the first scan field aims at the fourth vantage point at a same moment during the scan time period when the fourth scan field aims at the first vantage point; and the in-phase rotations of the second and third scan heads are configured such that the second scan field aims at the third vantage point at a same moment during the scan time period when the third scan field aims at the second vantage point.

17. The method of claim 12, wherein a first axis of rotation associated with the first scan head a second axis of rotation associated with the second scan head, a third axis of rotation associated with the third scan head, and a fourth axis of rotation associated with the fourth scan head are all vertical axes with respect to the real-world scene such that the detecting of the depth data performed by the first, second, third, and fourth depth scanning devices include scanning the real-world scene horizontally during the scan time period.

18. The method of claim 12, wherein a first axis of rotation associated with the first scan head a second axis of rotation associated with the second scan head, a third axis of rotation associated with the third scan head, and a fourth axis of rotation associated with the fourth scan head are all horizontal axes with respect to the real-world scene such that the detecting of the depth data performed by the first, second, third, and fourth depth scanning devices includes scanning the real-world scene vertically during the scan time period.

19. The method of claim 12 wherein:
the detecting of the depth data performed by the first depth scanning device includes rotating the first scan head in the first rotational direction to sweep, during the scan time period, only across surfaces that are included within a first rotation angle;
the detecting of the depth data performed by the second depth scanning device includes rotating the second scan head in the second rotational direction to sweep, during the scan time period, only across surfaces that are included within a second rotation angle;
the detecting of the depth data performed by the third depth scanning device includes rotating the third scan head in the third rotational direction to sweep, during the scan time period, only across surfaces that are included within a third rotation angle;
the detecting of the depth data performed by the fourth depth scanning device includes rotating the fourth scan head in the fourth rotational direction to sweep, during the scan time period, only across surfaces that are included within a fourth rotation angle; and
the first, second, third, and fourth rotation angles are each less than 360 degrees.

20. The method of claim 12, embodied as computer-executable instructions on at least one non-transitory computer-readable medium.

\* \* \* \* \*